(12) United States Patent
Voccio et al.

(10) Patent No.: US 9,521,004 B2
(45) Date of Patent: Dec. 13, 2016

(54) METHODS AND SYSTEMS OF GENERATING A BILLING FEED OF A DISTRIBUTED NETWORK

(71) Applicant: Rackspace US, Inc., San Antonio, TX (US)

(72) Inventors: Paul Voccio, Windcrest, TX (US); Matthew Charles Dietz, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

(21) Appl. No.: 13/752,255

(22) Filed: Jan. 28, 2013

(65) Prior Publication Data

US 2014/0211665 A1    Jul. 31, 2014

(51) Int. Cl.
*H04M 15/00* (2006.01)
*H04L 12/14* (2006.01)

(52) U.S. Cl.
CPC ......... *H04L 12/1403* (2013.01); *H04L 12/145* (2013.01); *H04L 12/1432* (2013.01); *H04M 15/00* (2013.01)

(58) Field of Classification Search
None
See application file for complete search history.

(56) References Cited

U.S. PATENT DOCUMENTS

| | | |
|---|---|---|
| 6,230,312 B1 | 5/2001 | Hunt |
| 6,351,843 B1 | 2/2002 | Berkley et al. |
| 6,381,735 B1 | 4/2002 | Hunt |
| 6,499,137 B1 | 12/2002 | Hunt |
| 6,546,553 B1 | 4/2003 | Hunt |
| 6,629,123 B1 | 9/2003 | Hunt |
| 6,718,414 B1 | 4/2004 | Doggett |
| 6,996,808 B1 | 2/2006 | Niewiadomski et al. |
| 7,263,689 B1 | 8/2007 | Edwards et al. |
| 7,353,507 B2 | 4/2008 | Gazdik et al. |
| 2003/0084158 A1 * | 5/2003 | Saito ............ H04L 12/14 709/226 |
| 2008/0052387 A1 * | 2/2008 | Heinz ............ H04L 41/5025 709/223 |
| 2008/0232358 A1 * | 9/2008 | Baker ............ H04L 45/566 370/389 |

(Continued)

FOREIGN PATENT DOCUMENTS

WO    WO 0145370 A1 *  6/2001  .......... H04M 3/2254

*Primary Examiner* — Robert C Scheibel
*Assistant Examiner* — Ayanah George
(74) *Attorney, Agent, or Firm* — Haynes and Boone, LLP

(57) ABSTRACT

A system and methods are provided for generating a billing feed for a distributed network system and reselling resources of the distributed network system. In one embodiment, a method includes observing a plurality of messages sent and received among components of the distributed network system, generating a call flow graph based on the plurality of messages of the distributed network system, and outputting a billing feed for the distributed network based on the call flow graph, to provide a billing feed including one or more billable events. billable events may be are based on one or more of received requests, underlying resource usage, time of usage, scope of usage. In this regard, the system may provide for one or more models of reselling resources of a distributed network system.

22 Claims, 12 Drawing Sheets

(56) References Cited

U.S. PATENT DOCUMENTS

| | | | |
|---|---|---|---|
| 2010/0188995 A1* | 7/2010 | Raleigh | G06Q 10/06375 370/252 |
| 2011/0167435 A1* | 7/2011 | Fang | G06F 9/544 719/329 |
| 2011/0239194 A1 | 9/2011 | Braude | |
| 2012/0167057 A1 | 6/2012 | Schmich et al. | |
| 2013/0122854 A1* | 5/2013 | Agarwal | H04L 12/141 455/405 |

* cited by examiner

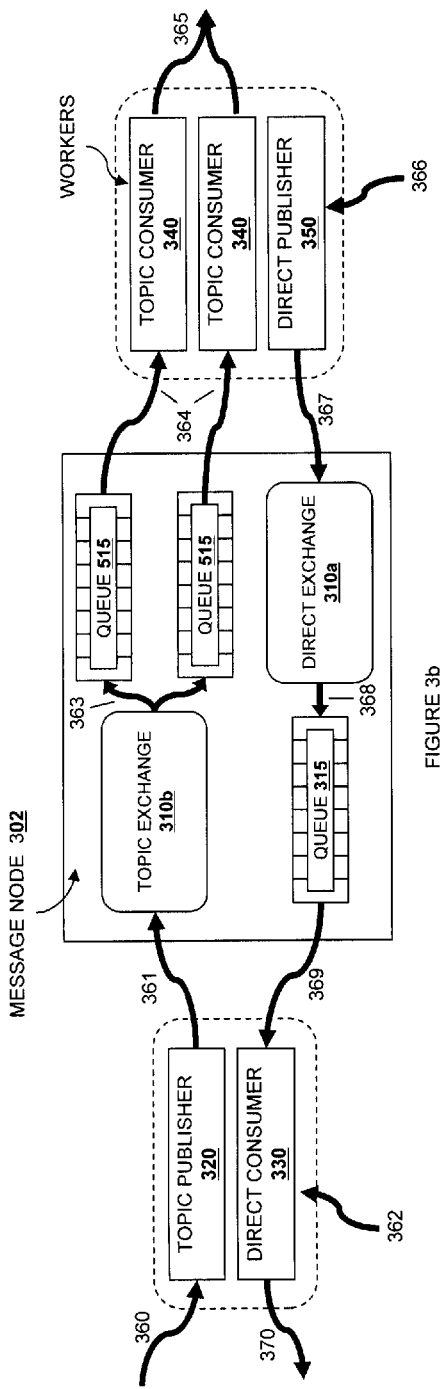

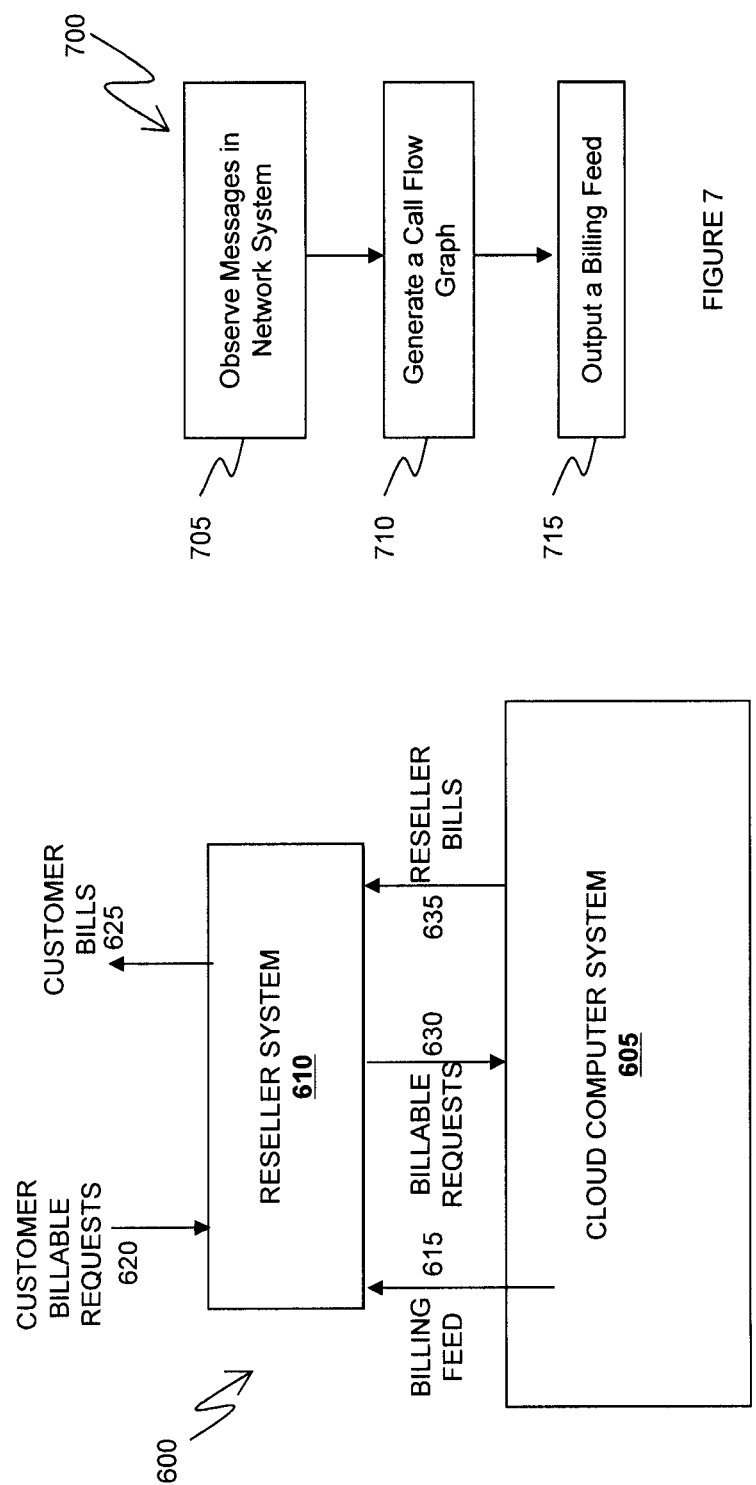

METHODS AND SYSTEMS OF GENERATING A BILLING FEED OF A DISTRIBUTED NETWORK

This application is related to nonprovisional U.S. patent application Ser. No. 13/752,147, now U.S. Pat. No. 9,135,145 entitled "Methods and Systems of Distributed Tracing," filed Jan. 28, 2013 and Ser. No. 13/752,234, entitled "Methods and Systems of Function-Specific Tracing," filed Jan. 28, 2013.

BACKGROUND

The present disclosure relates generally to, and more particularly to systems and methods for generated billing feeds for systems.

There are many different models for how cloud service providers should charge service. For example, by block of time, by instance-hour, by resource usage, etc. These different models have yet to sort out and provide a standard interface. In many instances, there is a billing model "baked in" to the production system. The company decides what to bill for, monitors it, and then charges its customers. What is desired is a system and method for providing different billing models at different levels of cloud service, and in particular for resellers of cloud services.

BRIEF DESCRIPTION OF THE DRAWINGS

FIG. 3b is a diagram showing how a directed message is sent using the message service according to various embodiments.

FIG. 3c is a diagram showing how a broadcast message is sent using the message service according to various embodiments.

FIG. 6 illustrates a graphical representation of a system for reselling resources of a distributed network system.

FIG. 7 illustrates a method for generating a billing feed for a distributed network system.

DETAILED DESCRIPTION

The following disclosure has reference to tracing and debugging in a distributed computing environment for generating a billing feed.

According to systems and methods are provided for motoring underlying resource usage by a reseller of cloud computing services. By providing a subscription to a billing feed for a reseller, a plurality of models may be employed for charging resellers access and use of a cloud computing services of a distributed network system.

Figure 1A:
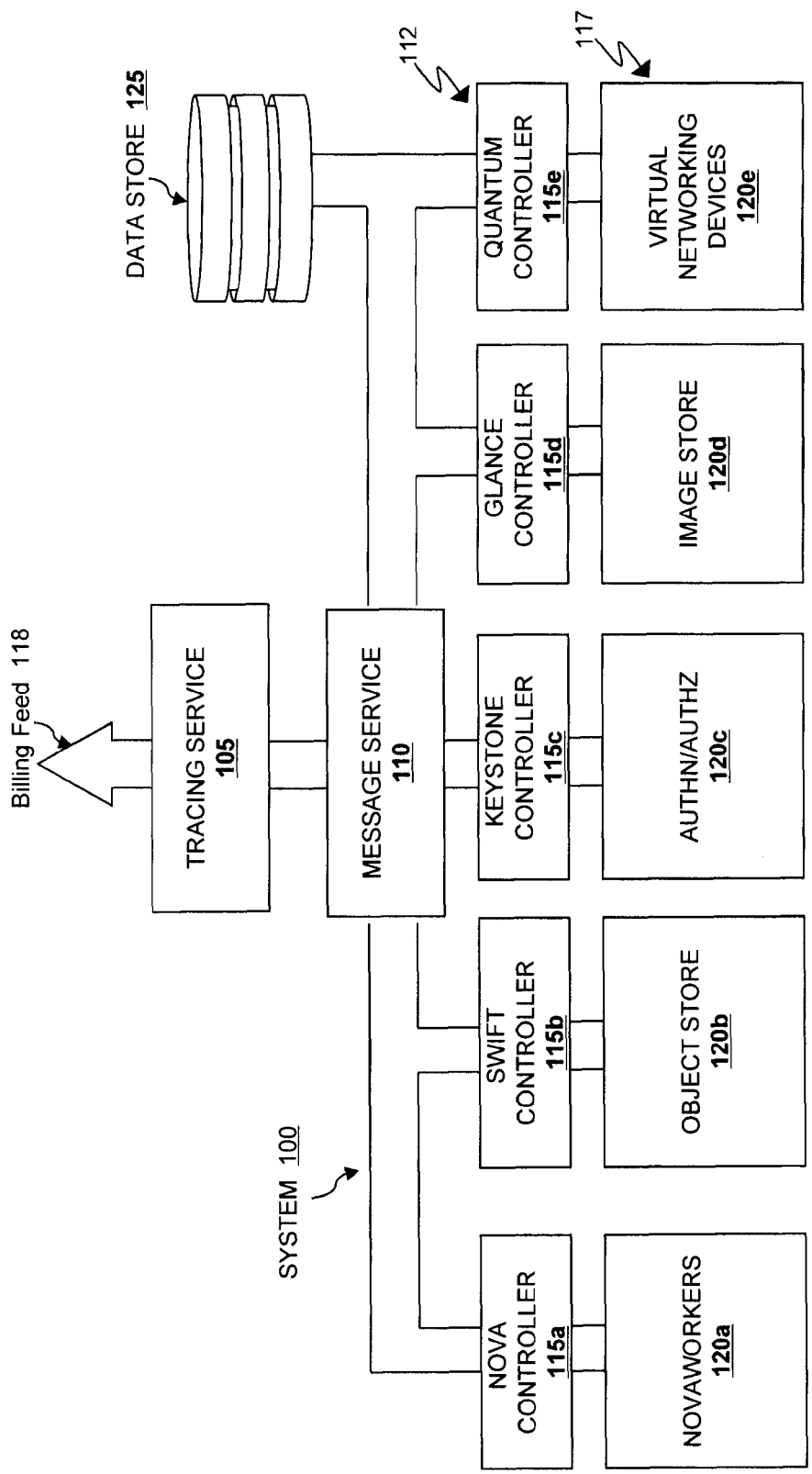
FIG. 1a is a schematic view of a distributed system.

FIG. 1A illustrates a simplified diagram of a distributed application 100 that can for which various embodiments of distributed tracing systems and methods may be implemented. It should be appreciated that application 100 is provided merely as an example and that other suitable distributed applications, middleware, or computing systems can benefit from distributed tracing and/or debugging capabilities described herein. According to one embodiment, application 100 may be a cloud service.

According to one embodiment, application 100 includes tracing service 105 configured to provide distributed tracing of the distributed application. As will be described in more detail below, distributed tracing can provide visibility into the performance, into the causes of errors or bugs, and increase reliability of the distributed application. By way of example, tracing service 105 can observe messages within the distributed application across queues and from particular components of the application. As depicted in FIG. 1A, tracing service 105 interfaces with message service 110 of application 100. Message service 110 connects various subsystems of the application 100, and message service 110 may be configured to pass messages relative to one or more elements of system 100.

System 100 may include one or more subsystems, such as controllers 112 and services 117. System 100 may include one or more controllers 112 for the application to be employed in a distributed architecture, such as cloud computing services. As depicted in FIG. 1A, controllers 112 include a compute controller 115a, a storage controller 115b, auth controller 115c, image service controller 115d and network controller 115e. Controllers 115 are described with reference to a cloud computing architecture in FIG. 1. By way of example, network controller 115a deals with host machine network configurations and can perform operations for allocating IP addresses, configuring VLANs, implementing security groups and configuring networks. Each of controllers 112 may interface with one or more services. As depicted in FIG. 1A, compute controller 115a interfaces with compute pool 120a, storage controller 115b may interface with object store 120b, auth controller 115c may interface with authentication/authorization controller 120c, image service controller 115d may interface with image store 120d and network controller 115e may interface with virtual networking devices 120e. Although controllers 115 and services 120 are with reference to an open architecture, it should be appreciated that the methods and systems for tracing may be equally applied to other distributed applications.

Figure 1B:
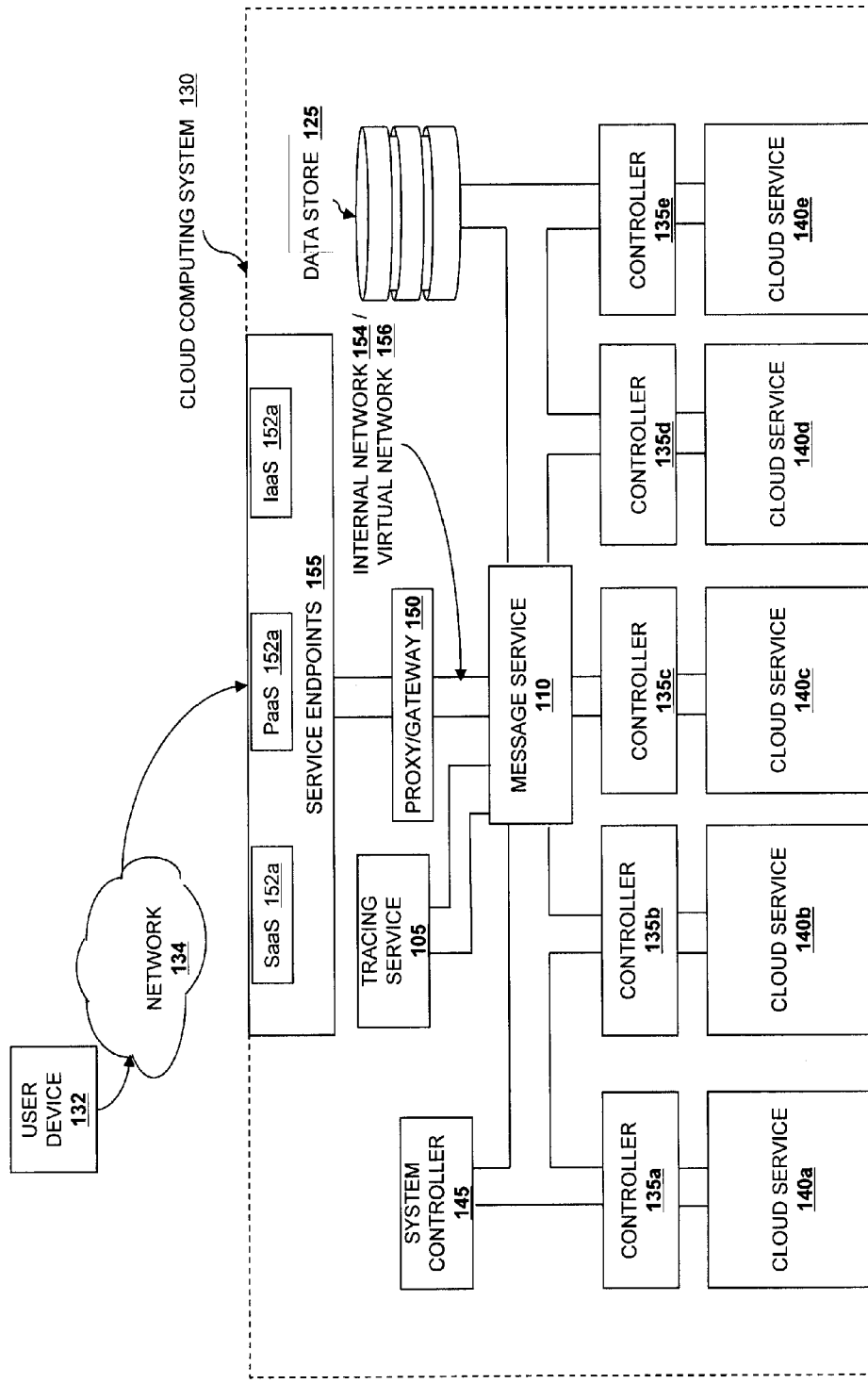
FIG. 1b is a schematic view illustrating an external view of a cloud computing system.

Referring now to FIG. 1b, an external view of a cloud computing system 130 is illustrated. Cloud computing system 130 includes tracing service 105 and message service 110. According to one embodiment, tracing service 105 can observe messages of cloud computing system 130 and constructs a call flow graph within each service and between services of the could computing system 130. According to another embodiment, controllers and services of the cloud computing system 130 may include tracing services to transmit message traces in response to sending or receiving of messages.

The cloud computing system 130 includes a user device 132 connected to a network 134 such as, for example, a Transport Control Protocol/Internet Protocol (TCP/IP) network (e.g., the Internet.) The user device 132 is coupled to the cloud computing system 130 via one or more service endpoints 155. Depending on the type of cloud service provided, these endpoints give varying amounts of control relative to the provisioning of resources within the cloud computing system 130. For example, SaaS endpoint 152*a* typically only gives information and access relative to the application running on the cloud storage system, and the scaling and processing aspects of the cloud computing system is obscured from the user. PaaS endpoint 152*b* typically gives an abstract Application Programming Interface (API) that allows developers to declaratively request or command the backend storage, computation, and scaling resources provided by the cloud, without giving exact control to the user. IaaS endpoint 152*c* typically provides the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 130 to be used for new, user-defined services without requiring specific support.

It is important to recognize that the control allowed via an IaaS endpoint is not complete. Within the cloud computing system 130 are one or more cloud controllers 135 (running what is sometimes called a "cloud operating system") that work on an even lower level, interacting with physical machines, managing the contradictory demands of the multi-tenant cloud computing system 130. In one embodiment, these correspond to the controllers and services discussed relative to FIG. 1*a*. The workings of the cloud controllers 135 are typically not exposed outside of the cloud computing system 130, even in an IaaS context. In one embodiment, the commands received through one of the service endpoints 155 are then routed via one or more internal networks 154. The internal network 154 couples the different services to each other. The internal network 154 may encompass various protocols or services, including but not limited to electrical, optical, or wireless connections at the physical layer; Ethernet, Fiber channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 154 is typically not exposed outside the cloud computing system, except to the extent that one or more virtual networks 156 may be exposed that control the internal routing according to various rules. The virtual networks 156 typically do not expose as much complexity as may exist in the actual internal network 154; but varying levels of granularity can be exposed to the control of the user, particularly in IaaS services.

In one or more embodiments, it may be useful to include various processing or routing nodes in the network layers 154 and 156, such as proxy/gateway 150. Other types of processing or routing nodes may include switches, routers, switch fabrics, caches, format modifiers, or correlators. These processing and routing nodes may or may not be visible to the outside. It is typical that one level of processing or routing nodes may be internal only, coupled to the internal network 154, whereas other types of network services may be defined by or accessible to users, and show up in one or more virtual networks 156. Either of the internal network 154 or the virtual networks 156 may be encrypted or authenticated according to the protocols and services described below.

In various embodiments, one or more parts of the cloud computing system 130 may be disposed on a single host. Accordingly, some of the "network" layers 154 and 156 may be composed of an internal call graph, inter-process communication (IPC), or a shared memory communication system.

Once a communication passes from the endpoints via a network layer 154 or 156, as well as possibly via one or more switches or processing devices 150, it is received by one or more applicable cloud controllers 135. The cloud controllers 135 are responsible for interpreting the message and coordinating the performance of the necessary corresponding services, returning a response if necessary. Although the cloud controllers 135 may provide services directly, more typically the cloud controllers 135 are in operative contact with the service resources 140 necessary to provide the corresponding services. For example, it is possible for different services to be provided at different levels of abstraction. For example, a service 140*a* may be a "compute" service that will work at an IaaS level, allowing the creation and control of user-defined virtual computing resources. In addition to the services discussed relative to FIG. 1*a*, a cloud computing system 130 may provide a declarative storage API, a SaaS-level Queue service 140*c*, a DNS service 140*d*, or a Database service 140*e*, or other application services without exposing any of the underlying scaling or computational resources. Other services are contemplated as discussed in detail below.

In various embodiments, various cloud computing services or the cloud computing system itself may require a message passing system. The message routing service 110 is available to address this need, but it is not a required part of the system architecture in at least one embodiment. In one embodiment, the message routing service is used to transfer messages from one component to another without explicitly linking the state of the two components. Note that this message routing service 110 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 125 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it may be useful for the cloud computing system 130 to have a system controller 145. In one embodiment, the system controller 145 is similar to the cloud computing controllers 135, except that it is used to control or direct operations at the level of the cloud computing system 130 rather than at the level of an individual service.

For clarity of discussion above, only one user device 132 has been illustrated as connected to the cloud computing system 130, and the discussion generally referred to receiving a communication from outside the cloud computing system, routing it to a cloud controller 135, and coordinating processing of the message via a service 130, the infrastructure described is also equally available for sending out messages. These messages may be sent out as replies to previous communications, or they may be internally sourced. Routing messages from a particular service 130 to a user device 132 is accomplished in the same manner as receiving a message from user device 132 to a service 130, just in reverse. The precise manner of receiving, processing, responding, and sending messages is described below with reference to the various discussed service embodiments. One of skill in the art will recognize, however, that a plurality of user devices 132 may, and typically will, be connected to the cloud computing system 130 and that each element or set of elements within the cloud computing system is replicable as necessary. Further, the cloud computing system 130, whether or not it has one endpoint or multiple endpoints, is expected to encompass embodiments including public clouds, private clouds, hybrid clouds, and multi-vendor clouds.

Figure 2:
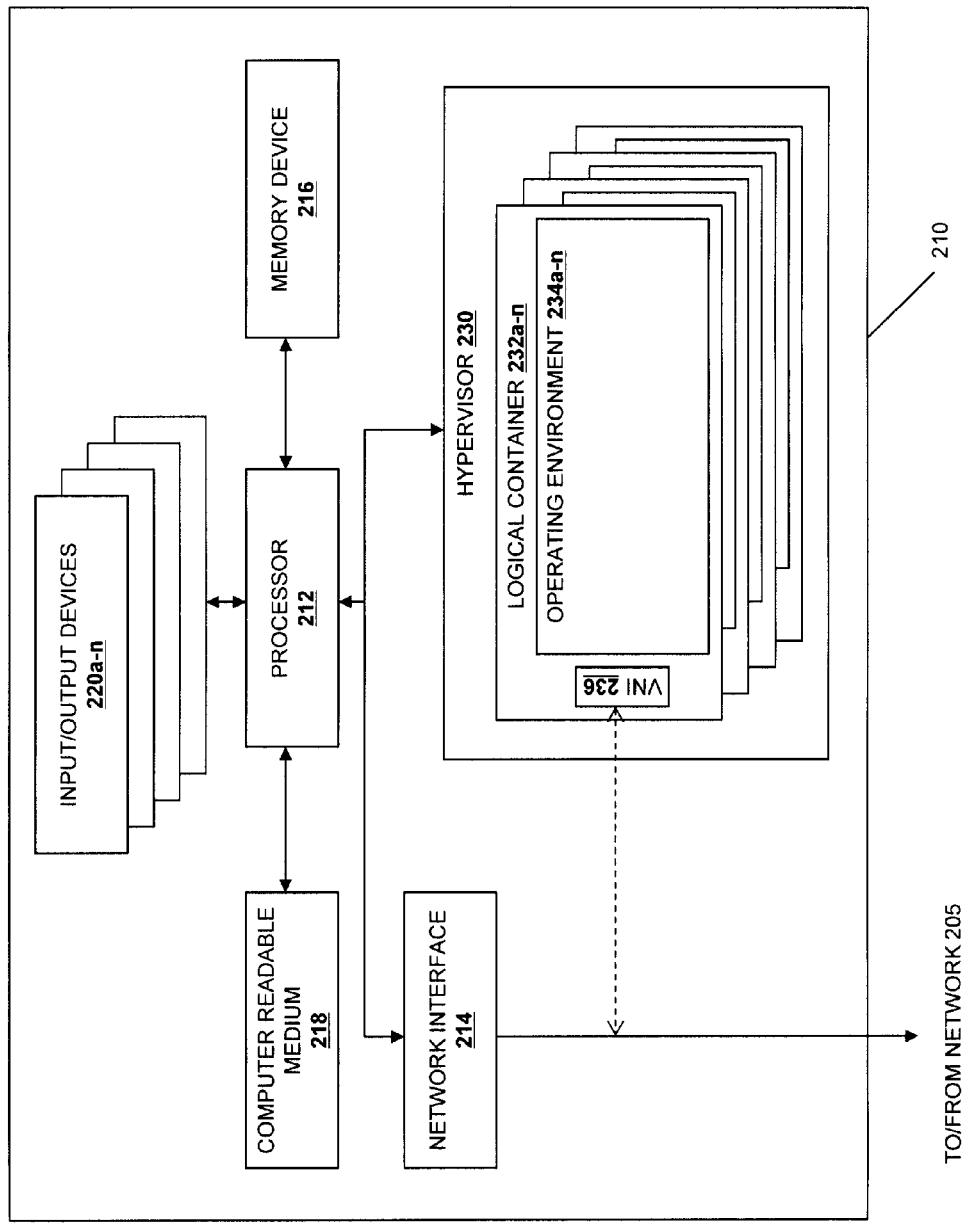
FIG. 2 is a schematic view illustrating an information processing system as used in various embodiments.

Each of the user device 132, the cloud computing system 130, the endpoints 152, the cloud controllers 135 and the cloud services 140 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, diagram 200 shows an information processing system 210 configured to host one or more virtual machines, coupled to a network 205. The network 205 could be one or both of the networks 154 and 156 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220*a-n* which are operably coupled to the processor 212, for inputting or outputting information, such as a display device 220*a*, a print device 220*b*, or other electronic circuitry 220*c-n* for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xenserver, KVM, VMware, Microsoft's Hyper-V, and emulation programs such as QEMU.

The hypervisor 230 includes the functionality to add, remove, and modify a number of logical containers 232*a-n* associated with the hypervisor. Zero, one, or many of the logical containers 232*a-n* contain associated operating environments 234*a-n*. The logical containers 232*a-n* can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

Message Service

Between the various virtual machines and virtual devices, it may be necessary to have a reliable messaging infrastructure. In various embodiments, a message queuing service is used for both local and remote communication so that there is no requirement that any of the services exist on the same physical machine. Various existing messaging infrastructures are contemplated, including AMQP, ZeroMQ, STOMP and XMPP. Note that this messaging system may or may not be available for user-addressable systems; in one preferred embodiment, there is a separation between internal messaging services and any messaging services associated with user data.

In one embodiment, the message service sits between various components and allows them to communicate in a loosely coupled fashion. This can be accomplished using Remote Procedure Calls (RPC hereinafter) to communicate between components, built atop either direct messages and/ or an underlying publish/subscribe infrastructure. In a typical embodiment, it is expected that both direct and topic-based exchanges are used. This allows for decoupling of the components, full asynchronous communications, and transparent balancing between equivalent components. In some embodiments, calls between different APIs can be supported over the distributed system by providing an adapter class which takes care of marshalling and unmarshalling of messages into function calls.

In one embodiment, a cloud controller 135 (or the applicable cloud service 140) creates two queues at initialization time, one that accepts node-specific messages and another that accepts generic messages addressed to any node of a particular type. This allows both specific node control as well as orchestration of the cloud service without limiting the particular implementation of a node. In an embodiment in which these message queues are bridged to an API, the API can act as a consumer, server, or publisher.

Figure 3A:
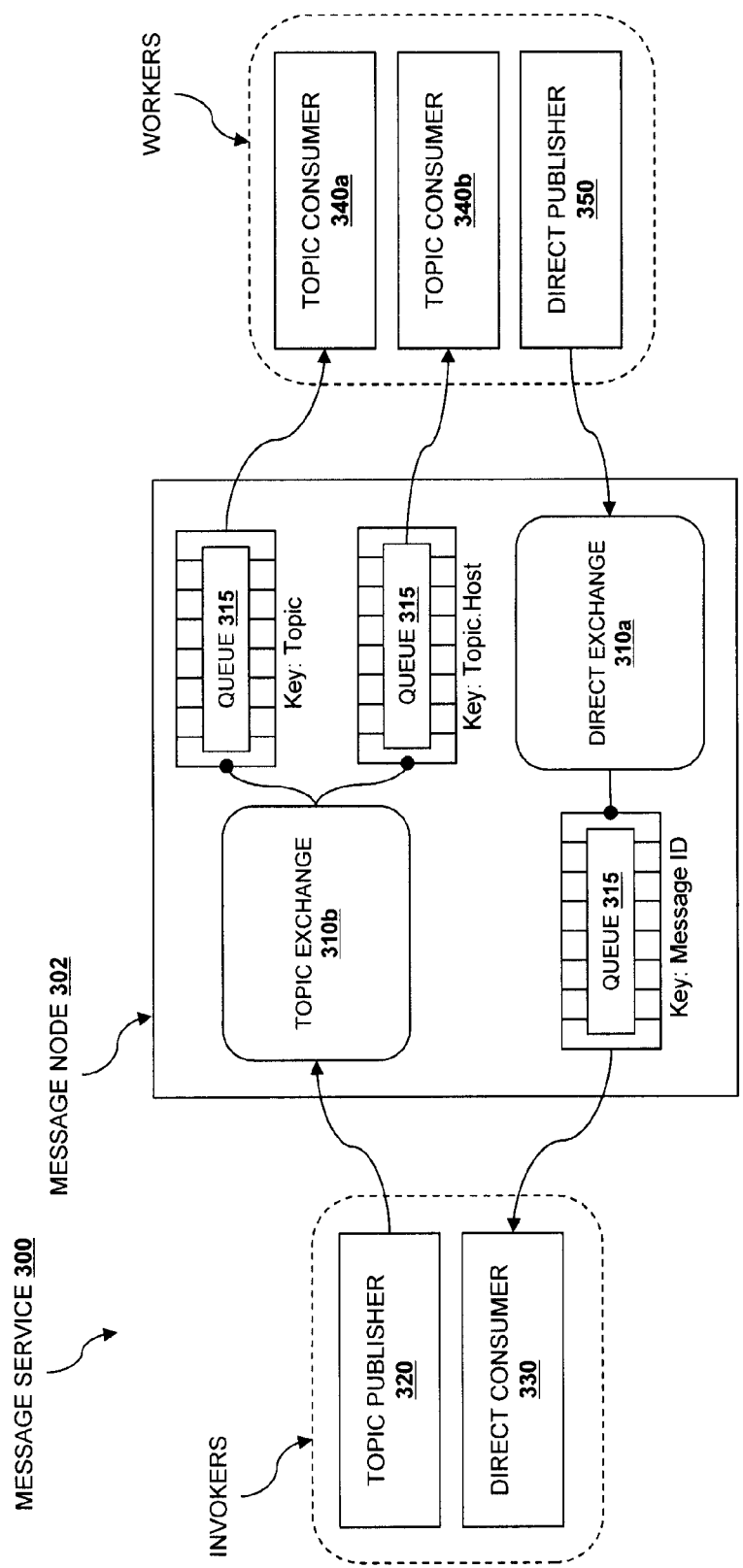
FIG. 3a shows a message service system according to various embodiments.

Turning now to FIG. 3*a*, one implementation of a message service 110 is shown. For simplicity of description, FIG. 3*a* shows the message service 300 when a single instance is deployed and shared in the cloud computing system 130, but the message service can be either centralized or fully distributed.

In one embodiment, the message service 300 keeps traffic associated with different queues or routing keys separate, so that disparate services can use the message service without interfering with each other. Accordingly, the message queue service may be used to communicate messages between network elements, between cloud services 140, between cloud controllers 135, between network elements, or between any group of sub-elements within the above. More than one message service may be used, and a cloud service 140 may use its own message service as required.

For clarity of exposition, access to the message service will be described in terms of "Invokers" and "Workers," but these labels are purely expository and are not intended to convey a limitation on purpose; in some embodiments, a single component (such as a VM) may act first as an Invoker, then as a Worker, the other way around, or simultaneously in each role. An Invoker is a component that sends messages in the system via two operations: 1) an RPC (Remote Procedure Call) directed message and ii) an RPC broadcast. A Worker is a component that receives messages from the message system and replies accordingly.

In one embodiment, there is a message node 302 including one or more exchanges 310. In a second embodiment, the message system is "brokerless," and one or more exchanges are located at each client. The exchanges 310 act as internal message routing elements so that components interacting with the message service can send and receive messages. In one embodiment, these exchanges are subdivided further into a topic exchange 310*a* and a direct exchange 310*b*. An exchange 310 is a routing structure or system that exists in a particular context. In a currently preferred embodiment, multiple contexts can be included within a single message service with each one acting independently of the others. In one embodiment, the type of exchange, such as a topic exchange 310*a* vs. direct exchange 310*b* determines the routing policy. In a second embodiment, the routing policy is determined via a series of routing rules evaluated by the exchange 310.

The direct exchange 310*a* is a routing element created during or for RPC directed message operations. In one embodiment, there are many instances of a direct exchange 310*a* that are created as needed for the message service. In a further embodiment, there is one direct exchange 310*a* created for each RPC directed message received by the system.

The topic exchange 310*a* is a routing element created during or for RPC directed broadcast operations. In one simple embodiment, every message received by the topic exchange is received by every other connected component. In a second embodiment, the routing rule within a topic exchange is described as publish-subscribe, wherein different components can specify a discriminating function and only topics matching the discriminator are passed along. In one embodiment, there are many instances of a topic exchange 310*b* that are created as needed for the message service. In one embodiment, there is one topic-based exchange for every topic created in the cloud computing system. In a second embodiment, there are a set number of topics that have pre-created and persistent topic exchanges 310*b*.

Within one or more of the exchanges 310, it may be useful to have a queue element 315. A queue 315 is a message stream; messages sent into the stream are kept in the queue 315 until a consuming component connects to the queue and fetches the message. A queue 315 can be shared or can be exclusive. In one embodiment, queues with the same topic are shared amongst Workers subscribed to that topic.

In a typical embodiment, a queue 315 will implement a FIFO policy for messages and ensure that they are delivered in the same order that they are received. In other embodiments, however, a queue 315 may implement other policies, such as LIFO, a priority queue (highest-priority messages are delivered first), or age (oldest objects in the queue are delivered first), or other configurable delivery policies. In other embodiments, a queue 315 may or may not make any guarantees related to message delivery or message persistence.

In one embodiment, element 320 is a topic publisher. A topic publisher 320 is created, instantiated, or awakened when an RPC directed message or an RPC broadcast operation is executed; this object is instantiated and used to push a message to the message system. Every publisher connects always to the same topic-based exchange; its life-cycle is limited to the message delivery.

In one embodiment, element 330 is a direct consumer. A direct consumer 330 is created, instantiated, or awakened if an RPC directed message operation is executed; this component is instantiated and used to receive a response message from the queuing system. Every direct consumer 330 connects to a unique direct-based exchange via a unique exclusive queue, identified by a UUID or other unique name. The life-cycle of the direct consumer 330 is limited to the message delivery. In one embodiment, the exchange and queue identifiers are included the message sent by the topic publisher 320 for RPC directed message operations.

In one embodiment, elements 340 (elements 340*a* and 340*b*) are topic consumers. In one embodiment, a topic consumer 340 is created, instantiated, or awakened at system start. In a second embodiment, a topic consumer 340 is created, instantiated, or awakened when a topic is registered with the message system 300. In a third embodiment, a topic consumer 340 is created, instantiated, or awakened at the same time that a Worker or Workers are instantiated and persists as long as the associated Worker or Workers have not been destroyed. In this embodiment, the topic consumer 340 is used to receive messages from the queue and it invokes the appropriate action as defined by the Worker role. A topic consumer 340 connects to the topic-based exchange either via a shared queue or via a unique exclusive queue. In one embodiment, every Worker has two associated topic consumers 340, one that is addressed only during an RPC broadcast operations (and it connects to a shared queue whose exchange key is defined by the topic) and the other that is addressed only during an RPC directed message operations, connected to a unique queue whose with the exchange key is defined by the topic and the host.

In one embodiment, element 350 is a direct publisher. In one embodiment, a direct publisher 350 is created, instantiated, or awakened for RPC directed message operations and it is instantiated to return the message required by the request/response operation. The object connects to a direct-based exchange whose identity is dictated by the incoming message.

Turning now to FIG. 3*b*, one embodiment of the process of sending an RPC directed message is shown relative to the elements of the message system 300 as described relative to FIG. 3*a*. All elements are as described above relative to FIG. 3*a* unless described otherwise. At step 360, a topic publisher 320 is instantiated. At step 361, the topic publisher 320 sends a message to an exchange 310*b*. At step 362, a direct consumer 330 is instantiated to wait for the response message. At step 363, the message is dispatched by the exchange 310*b*. At step 364, the message is fetched by the topic consumer 340 dictated by the routing key (either by topic or by topic and host). At step 365, the message is passed to a Worker associated with the topic consumer 340. If needed, at step 366, a direct publisher 350 is instantiated to send a response message via the message system 300. At step 367, the direct publisher 340 sends a message to an exchange 310a. At step 368, the response message is dispatched by the exchange 310a. At step 369, the response message is fetched by the direct consumer 330 instantiated to receive the response and dictated by the routing key. At step 370, the message response is passed to the Invoker.

Turning now to FIG. 3c, one embodiment of the process of sending an RPC broadcast message is shown relative to the elements of the message system 300 as described relative to FIG. 3a. All elements are as described above relative to FIG. 3a unless described otherwise. At step 580, a topic publisher 520 is instantiated. At step 381, the topic publisher 320 sends a message to an exchange 310a. At step 382, the message is dispatched by the exchange 310b. At step 383, the message is fetched by a topic consumer 340 dictated by the routing key (either by topic or by topic and host). At step 384, the message is passed to a Worker associated with the topic consumer 340.

Figure 5:
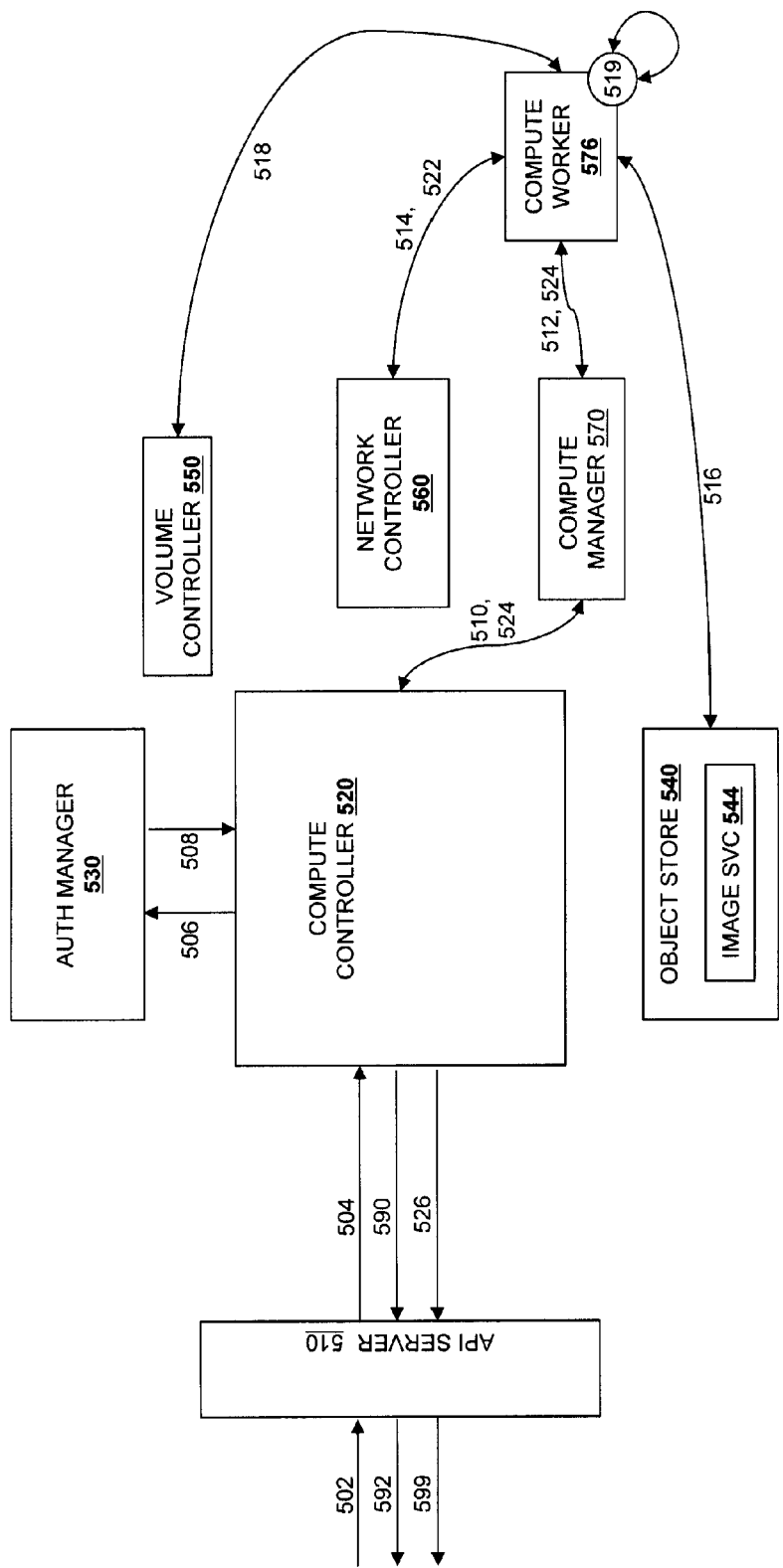
FIG. 5 shows an instantiating and launching process for virtual resources according to various embodiments.

In some embodiments, a response to an RPC broadcast message can be requested. In that case, the process follows the steps outlined relative to FIG. 3b to return a response to the Invoker. As the process of instantiating and launching a VM instance in FIG. 5 shows, requests to a distributed service or application may move through various software components, which may be running on one physical machine or may span across multiple machines and network boundaries.

Figure 4:
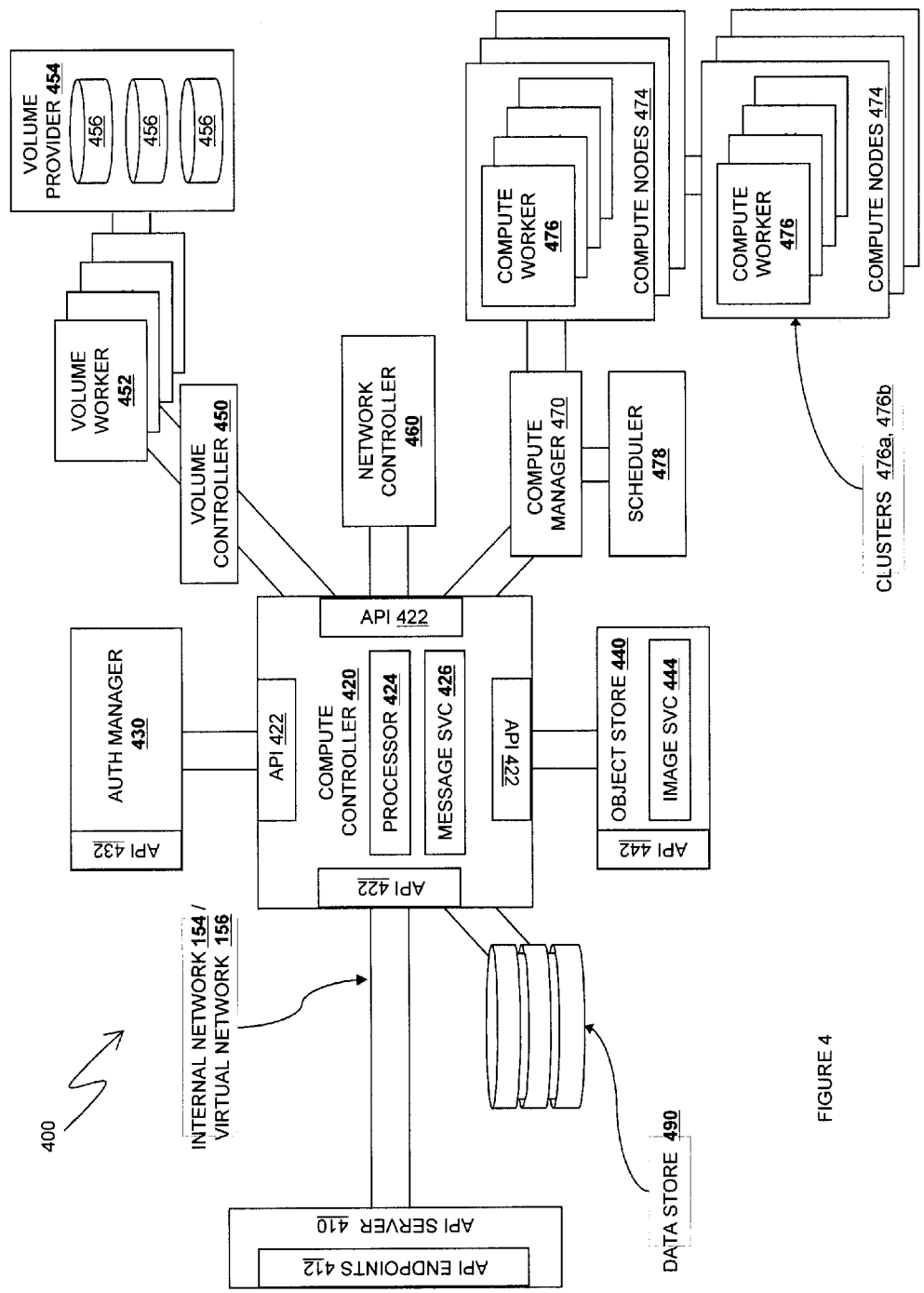
FIG. 4 shows IaaS-style computational cloud service according to various embodiments.

Turning now to FIG. 4, an IaaS-style computational cloud service (a "compute" service) is shown at 400 according to one embodiment. This is one embodiment of a cloud controller 135 with associated cloud service 140 as described relative to FIG. 1b. Except as described relative to specific embodiments, the existence of a compute service does not require or prohibit the existence of other portions of the cloud computing system 130 nor does it require or prohibit the existence of other cloud controllers 135 with other respective services 140.

To the extent that some components described relative to the compute service 400 are similar to components of the larger cloud computing system 130, those components may be shared between the cloud computing system 130 and a compute service 400, or they may be completely separate. Further, to the extent that "controllers," "nodes," "servers," "managers," "VMs," or similar terms are described relative to the compute service 400, those can be understood to comprise any of a single information processing device 210 as described relative to FIG. 2, multiple information processing devices 210, a single VM as described relative to FIG. 2, a group or cluster of VMs or information processing devices as described relative to FIG. 3. These may run on a single machine or a group of machines, but logically work together to provide the described function within the system.

In one embodiment, compute service 400 includes an API Server 410, a Compute Controller 420, an Auth Manager 430, an Object Store 440, a Volume Controller 450, a Network Controller 460, and a Compute Manager 470. These components are coupled by a communications network of the type previously described. In one embodiment, communications between various components are message-oriented, using HTTP or a messaging protocol such as AMQP, ZeroMQ, or STOMP.

Although various components are described as "calling" each other or "sending" data or messages, one embodiment makes the communications or calls between components asynchronous with callbacks that get triggered when responses are received. This allows the system to be architected in a "shared-nothing" fashion. To achieve the shared-nothing property with multiple copies of the same component, compute service 400 further includes distributed data store 490. Global state for compute service 400 is written into this store using atomic transactions when required. Requests for system state are read out of this store. In some embodiments, results are cached within controllers for short periods of time to improve performance. In various embodiments, the distributed data store 490 can be the same as, or share the same implementation as Object Store 440.

In one embodiment, the API server 410 includes external API endpoints 412. In one embodiment, the external API endpoints 412 are provided over an RPC-style system, such as CORBA, DCE/COM, SOAP, or XML-RPC. These follow the calling structure and conventions defined in their respective standards. In another embodiment, the external API endpoints 412 are basic HTTP web services following a REST pattern and identifiable via URL. Requests to read a value from a resource are mapped to HTTP GETs, requests to create resources are mapped to HTTP PUTs, requests to update values associated with a resource are mapped to HTTP POSTs, and requests to delete resources are mapped to HTTP DELETEs. In some embodiments, other REST-style verbs are also available, such as the ones associated with WebDay. In a third embodiment, the API endpoints 412 are provided via internal function calls, IPC, or a shared memory mechanism. Regardless of how the API is presented, the external API endpoints 412 are used to handle authentication, authorization, and basic command and control functions using various API interfaces. In one embodiment, the same functionality is available via multiple APIs, including APIs associated with other cloud computing systems. This enables API compatibility with multiple existing tool sets created for interaction with offerings from other vendors.

The Compute Controller 420 coordinates the interaction of the various parts of the compute service 400. In one embodiment, the various internal services that work together to provide the compute service 400, are internally decoupled by adopting a service-oriented architecture (SOA). The Compute Controller 420 serves as an internal API server, allowing the various internal controllers, managers, and other components to request and consume services from the other components. In one embodiment, all messages pass through the Compute Controller 420. In a second embodiment, the Compute Controller 420 brings up services and advertises service availability, but requests and responses go directly between the components making and serving the request. In a third embodiment, there is a hybrid model in which some services are requested through the Compute Controller 420, but the responses are provided directly from one component to another.

In one embodiment, communication to and from the Compute Controller 420 is mediated via one or more internal API endpoints 422, provided in a similar fashion to those discussed above. The internal API endpoints 422 differ from the external API endpoints 412 in that the internal API endpoints 422 advertise services only available within the overall compute service 400, whereas the external API endpoints 412 advertise services available outside the compute service 400. There may be one or more internal APIs 422 that correspond to external APIs 412, but it is expected that there will be a greater number and variety of internal API calls available from the Compute Controller 420.

In one embodiment, the Compute Controller 420 includes an instruction processor 424 for receiving and processing instructions associated with directing the compute service 400. For example, in one embodiment, responding to an API call involves making a series of coordinated internal API calls to the various services available within the compute service 400, and conditioning later API calls on the outcome or results of earlier API calls. The instruction processor 424 is the component within the Compute Controller 420 responsible for marshaling arguments, calling services, and making conditional decisions to respond appropriately to API calls.

In one embodiment, the instruction processor 424 is implemented as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor 424, running as a discrete operating environment, as a process in an active operating environment, or can be run from a low-power embedded processor. In a second embodiment, the instruction processor 424 takes the form of a series of interoperating but discrete components, some or all of which may be implemented as software programs. In another embodiment, the instruction processor 424 is a discrete component, using a small amount of flash and a low power processor, such as a low-power ARM processor. In a further embodiment, the instruction processor includes a rule engine as a submodule as described herein.

In one embodiment, the Compute Controller 420 includes a message queue as provided by message service 426. In accordance with the service-oriented architecture described above, the various functions within the compute service 400 are isolated into discrete internal services that communicate with each other by passing data in a well-defined, shared format, or by coordinating an activity between two or more services. In one embodiment, this is done using a message queue as provided by message service 426. The message service 426 brokers the interactions between the various services inside and outside the Compute Service 400.

In one embodiment, the message service 426 is implemented similarly to the message service described relative to FIGS. 3a-3c. The message service 426 may use the message service 110 directly, with a set of unique exchanges, or may use a similarly configured but separate service.

The Auth Manager 430 provides services for authenticating and managing user, account, role, project, group, quota, and security group information for the compute service 400. In a first embodiment, every call is necessarily associated with an authenticated and authorized entity within the system, and so is or can be checked before any action is taken. In another embodiment, internal messages are assumed to be authorized, but all messages originating from outside the service are suspect. In this embodiment, the Auth Manager checks the keys provided associated with each call received over external API endpoints 412 and terminates and/or logs any call that appears to come from an unauthenticated or unauthorized source. In a third embodiment, the Auth Manager 430 is also used for providing resource-specific information such as security groups, but the internal API calls for that information are assumed to be authorized. External calls are still checked for proper authentication and authorization. Other schemes for authentication and authorization can be implemented by flagging certain API calls as needing verification by the Auth Manager 430, and others as needing no verification.

In one embodiment, external communication to and from the Auth Manager 430 is mediated via one or more authentication and authorization API endpoints 632, provided in a similar fashion to those discussed above. The authentication and authorization API endpoints 432 differ from the external API endpoints 612 in that the authentication and authorization API endpoints 432 are only used for managing users, resources, projects, groups, and rules associated with those entities, such as security groups, RBAC roles, etc. In another embodiment, the authentication and authorization API endpoints 432 are provided as a subset of external API endpoints 412.

In one embodiment, the Auth Manager 430 includes rules processor 434 for processing the rules associated with the different portions of the compute service 400. In one embodiment, this is implemented in a similar fashion to the instruction processor 424 described above.

The Object Store 440 provides redundant, scalable object storage capacity for arbitrary data used by other portions of the compute service 400. At its simplest, the Object Store 440 can be implemented one or more block devices exported over the network. In a second embodiment, the Object Store 440 is implemented as a structured, and possibly distributed data organization system. Examples include relational database systems—both standalone and clustered—as well as non-relational structured data storage systems like MongoDB, Apache Cassandra, or Redis. In a third embodiment, the Object Store 440 is implemented as a redundant, eventually consistent, fully distributed data storage service.

In one embodiment, external communication to and from the Object Store 440 is mediated via one or more object storage API endpoints 442, provided in a similar fashion to those discussed above. In one embodiment, the object storage API endpoints 442 are internal APIs only. In a second embodiment, the Object Store 440 is provided by a separate cloud service 130, so the "internal" API used for compute service 400 is the same as the external API provided by the object storage service itself.

In one embodiment, the Object Store 440 includes an Image Service 444. The Image Service 444 is a lookup and retrieval system for virtual machine images. In one embodiment, various virtual machine images can be associated with a unique project, group, user, or name and stored in the Object Store 440 under an appropriate key. In this fashion multiple different virtual machine image files can be provided and programmatically loaded by the compute service 400.

The Volume Controller 450 coordinates the provision of block devices for use and attachment to virtual machines. In one embodiment, the Volume Controller 450 includes Volume Workers 452. The Volume Workers 452 are implemented as unique virtual machines, processes, or threads of control that interact with one or more backend volume providers 454 to create, update, delete, manage, and attach one or more volumes 456 to a requesting VM.

In a first embodiment, the Volume Controller 450 is implemented using a SAN that provides a sharable, network-exported block device that is available to one or more VMs, using a network block protocol such as iSCSI. In this embodiment, the Volume Workers 452 interact with the SAN to manage and iSCSI storage to manage LVM-based instance volumes, stored on one or more smart disks or independent processing devices that act as volume providers 454 using their embedded storage 456. In a second embodiment, disk volumes 456 are stored in the Object Store 440 as image files under appropriate keys. The Volume Controller 450 interacts with the Object Store 440 to retrieve a disk volume 456 and place it within an appropriate logical container on the same information processing system 440 that contains the requesting VM. An instruction processing module acting in concert with the instruction processor and hypervisor on the information processing system 240 acts as the volume provider 454, managing, mounting, and unmounting the volume 456 on the requesting VM. In a further embodiment, the same volume 456 may be mounted on two or more VMs, and a block-level replication facility may be used to synchronize changes that occur in multiple places. In a third embodiment, the Volume Controller 450 acts as a block-device proxy for the Object Store 440, and directly exports a view of one or more portions of the Object Store 440 as a volume. In this embodiment, the volumes are simply views onto portions of the Object Store 440, and the Volume Workers 454 are part of the internal implementation of the Object Store 440.

In one embodiment, the Network Controller 460 manages the networking resources for VM hosts managed by the compute manager 470. Messages received by Network Controller 460 are interpreted and acted upon to create, update, and manage network resources for compute nodes within the compute service, such as allocating fixed IP addresses, configuring VLANs for projects or groups, or configuring networks for compute nodes.

In one embodiment, the Network Controller 460 may use a shared cloud controller directly, with a set of unique addresses, identifiers, and routing rules, or may use a similarly configured but separate service.

In one embodiment, the Compute Manager 470 manages computing instances for use by API users using the compute service 400. In one embodiment, the Compute Manager 470 is coupled to a plurality of resource pools 472, each of which includes one or more compute nodes 474. Each compute node 474 is a virtual machine management system as described relative to FIG. 3 and includes a compute worker 476, a module working in conjunction with the hypervisor and instruction processor to create, administer, and destroy multiple user- or system-defined logical containers and operating environments—VMs—according to requests received through the API. In various embodiments, the pools of compute nodes may be organized into clusters, such as clusters 476a and 476b. In one embodiment, each resource pool 472 is physically located in one or more data centers in one or more different locations. In another embodiment, resource pools have different physical or software resources, such as different available hardware, higher-throughput network connections, or lower latency to a particular location.

In one embodiment, the Compute Manager 470 allocates VM images to particular compute nodes 474 via a Scheduler 478. The Scheduler 478 is a matching service; requests for the creation of new VM instances come in and the most applicable Compute nodes 474 are selected from the pool of potential candidates. In one embodiment, the Scheduler 478 selects a compute node 474 using a random algorithm. Because the node is chosen randomly, the load on any particular node tends to be non-coupled and the load across all resource pools tends to stay relatively even.

In a second embodiment, a smart scheduler 478 is used. A smart scheduler analyzes the capabilities associated with a particular resource pool 472 and its component services to make informed decisions on where a new instance should be created. When making this decision it consults not only all the Compute nodes across the resource pools 472 until the ideal host is found.

In a third embodiment, a distributed scheduler 478 is used. A distributed scheduler is designed to coordinate the creation of instances across multiple compute services 400. Not only does the distributed scheduler 478 analyze the capabilities associated with the resource pools 472 available to the current compute service 400, it also recursively consults the schedulers of any linked compute services until the ideal host is found.

In one embodiment, either the smart scheduler or the distributed scheduler is implemented using a rules engine 479 (not shown) and a series of associated rules regarding costs and weights associated with desired compute node characteristics. When deciding where to place an Instance, rules engine 479 compares a Weighted Cost for each node. In one embodiment, the Weighting is just the sum of the total Costs. In a second embodiment, a Weighting is calculated using an exponential or polynomial algorithm. In the simplest embodiment, costs are nothing more than integers along a fixed scale, although costs can also be represented by floating point numbers, vectors, or matrices. Costs are computed by looking at the various Capabilities of the available node relative to the specifications of the Instance being requested. The costs are calculated so that a "good" match has lower cost than a "bad" match, where the relative goodness of a match is determined by how closely the available resources match the requested specifications.

In one embodiment, specifications can be hierarchical, and can include both hard and soft constraints. A hard constraint is a constraint is a constraint that cannot be violated and have an acceptable response. This can be implemented by having hard constraints be modeled as infinite-cost requirements. A soft constraint is a constraint that is preferable, but not required. Different soft constraints can have different weights, so that fulfilling one soft constraint may be more cost-effective than another. Further, constraints can take on a range of values, where a good match can be found where the available resource is close, but not identical, to the requested specification. Constraints may also be conditional, such that constraint A is a hard constraint or high-cost constraint if Constraint B is also fulfilled, but can be low-cost if Constraint C is fulfilled.

As implemented in one embodiment, the constraints are implemented as a series of rules with associated cost functions. These rules can be abstract, such as preferring nodes that don't already have an existing instance from the same project or group. Other constraints (hard or soft), may include: a node with available GPU hardware; a node with an available network connection over 100 Mbps; a node that can run Windows instances; a node in a particular geographic location, etc.

When evaluating the cost to place a VM instance on a particular node, the constraints are computed to select the group of possible nodes, and then a weight is computed for each available node and for each requested instance. This allows large requests to have dynamic weighting; if 1000 instances are requested, the consumed resources on each node are "virtually" depleted so the Cost can change accordingly.

Turning now to FIG. 5, a diagram showing one embodiment of the process of instantiating and launching a VM instance is shown as diagram 500. At time 502, the API Server 510 receives a request to create and run an instance with the appropriate arguments. In one embodiment, this is done by using a command-line tool that issues arguments to the API server 510. In a second embodiment, this is done by sending a message to the API Server 510. In one embodiment, the API to create and run the instance includes arguments specifying a resource type, a resource image, and control arguments. A further embodiment includes requester information and is signed and/or encrypted for security and privacy. At time 504, API server 510 accepts the message, examines it for API compliance, and relays a message to Compute Controller 520, including the information needed to service the request. In an embodiment in which user information accompanies the request, either explicitly or implicitly via a signing and/or encrypting key or certificate, the Compute Controller 520 sends a message to Auth Manager 530 to authenticate and authorize the request at time 506 and Auth Manager 530 sends back a response to Compute Controller 520 indicating whether the request is allowable at time 508. If the request is allowable, a message is sent to the Compute Manager 570 to instantiate the requested resource at time 510. At time 512, the Compute Manager selects a Compute Worker 576 and sends a message to the selected Worker to instantiate the requested resource. At time 514, Compute Worker identifies and interacts with Network Controller 560 to get a proper VLAN and IP address. At time 516, the selected Worker 576 interacts with the Object Store 540 and/or the Image Service 544 to locate and retrieve an image corresponding to the requested resource. If requested via the API, or used in an embodiment in which configuration information is included on a mountable volume, the selected Worker interacts with the Volume Controller 550 at time 518 to locate and retrieve a volume for the to-be-instantiated resource. At time 519, the selected Worker 576 uses the available virtualization infrastructure to instantiate the resource, mount any volumes, and perform appropriate configuration. At time 522, selected Worker 556 interacts with Network Controller 560 to configure routing. At time 524, a message is sent back to the Compute Controller 520 via the Compute Manager 550 indicating success and providing necessary operational details relating to the new resource. At time 526, a message is sent back to the API Server 526 with the results of the operation as a whole. At time 599, the API-specified response to the original command is provided from the API Server 510 back to the originally requesting entity. If at any time a requested operation cannot be performed, then an error is returned to the API Server at time 590 and the API-specified response to the original command is provided from the API server at time 592. For example, an error can be returned if a request is not allowable at time 508, if a VLAN cannot be created or an IP allocated at time 514, if an image cannot be found or transferred at time 516, etc.

Having described an example of a distributed application and operation within a distributed network system, various embodiments of methods and systems for generating billing feeds for a distributed network system are described with references to FIGS. 6-11. As used herein, a distributed network system may relate to one or more services and components, and in particular cloud services. Various embodiments of the methods and systems disclosed herein may permit generation of one of more billing feeds for distributed network services including cloud services and for generation one or more of billing feeds and reseller bills for a reseller system.

FIG. 6 illustrates a simplified diagram of a system for reselling resources of a distributed network system, and in particular a cloud computing system. System 600 includes cloud computing system 605 (e.g., cloud computing system 130) and a reseller system 610. According to one embodiment, cloud computer system 605 may provide cloud services to reseller system 610 and a billing feed 615. Billing feed 615 may include one or more potential billable elements for tracking usage. Billing feed 615 may provide data based on one or more models for tracking and billing usage.

Reselling system 610 may be configured as an intermediary for selling and/or providing services of cloud computing system 605 to one or more entities, such as customers. Services by reseller system 610 may be based on requests, such as customer billable request 620. Based on received requests for cloud services, reseller system may generate one or more customer bills 625. Similarly, reseller system may generate one or more requests, such as billable requests 630 for cloud services. Based on requested services buy reseller system 610, cloud computing system 605 may generate one or more reseller bills 635. According to one embodiment, customer bills 625 generated by reseller system 610 may be based on one or more of billing feed 615 and service fees, such as reseller bills 635.

FIG. 7 illustrates a method for generating a billing feed for a distributed network system providing cloud services. Method 700 may be initiated at block 705 for observing a plurality of messages sent and received among components of the distributed network system, such as system 100 of FIG. 1*a* or cloud computing system 130 of FIG. 1*b*. Observing may be based on a sequence of received message traces transmitted by one or more of components of the distributed network system. For example, components of the distributed network system may be modified to transmit message traces in response to sending or receiving of messages. According to another embodiment, observing may include subscribing to one or more message queues of a messaging service associated with the distributed network system. In yet another embodiment, observing may be based on a separate tracing service within each service of the distributed network system, the separate tracing service with a separate message domain.

At block 710, method 700 includes generating a call flow graph based on the plurality of messages of the distributed network system. The call flow graph can provide a representation of observed calls in the distributed network system as a call stack. As discussed above with reference to FIG. 1*a*, one or more of controllers and services may exchange messages. In one embodiment, messages between the various services (e.g., Nova, Swift, Keystone, etc.)—and in general, even within the various services—are generally modeled as asynchronous messages within the defined topology. For example, the messages may be AMPQ or HTTP messages, although there are also some SQL connections and other protocols that get sent across the wire. In certain embodiments, messages in the distributed network system can be sent based on the routing envelope and observed by characterizing responses and requests.

Messages can describe or illustrate the flow and usage for each independent system within the larger distributed network system. According to one embodiment, after of aggregating the information together into a call stack, a tracing service may be modified to provide a feed of possibly-billable events. These events can include both specific information (process time, instance-seconds) as well as higher-level information corresponding to time spent within a specified subsystem.

According to another embodiment, method 700 may include outputting a billing feed for the distributed network at block 715 based on the call flow graph, to provide a billing feed including one or more billable events. In one embodiment, billable events are based on one or more of received requests, underlying resource usage, time of usage, and scope of usage. The billable feed can include billable events based on requests to the reseller and reseller billing. In addition, billing feed may also identify resources used and documentation for a reseller of a cloud computing service.

The billing feed for each reseller can allow for a plurality of models of billing, such that different business models track different metrics, including metrics different than those billed for by the cloud services provider.

According to one embodiment, a billing feed (e.g., billing feed 118) and billing elements may be output based on one or more call stacks, wherein the billing elements may account for how cloud service requests may flow through and be processed by various functions, procedures, methods, or other applicable units of software routines. In various embodiments, such a billing feed may be constructed at least in part by tracing request and response messages across processes, software components, virtual machines, physical machines, software services, and network boundaries, from receiving of requests (e.g., an entry of a call to the API) all the way down to where work as performed (e.g., at worker units or other back-end processes) and back, as further described herein.

In this regard, various embodiments of the methods and systems may construct a call flow graph (may also be referred herein as a call tree) by observing request and response messages between various components of a distributed application. A call flow graph may be used to capture and represent causal relationships between processing activities of various components. That is, a call flow graph may encode how a processing activity of one or more components may be caused or triggered by a processing activity of one or more other components.

Figure 8:
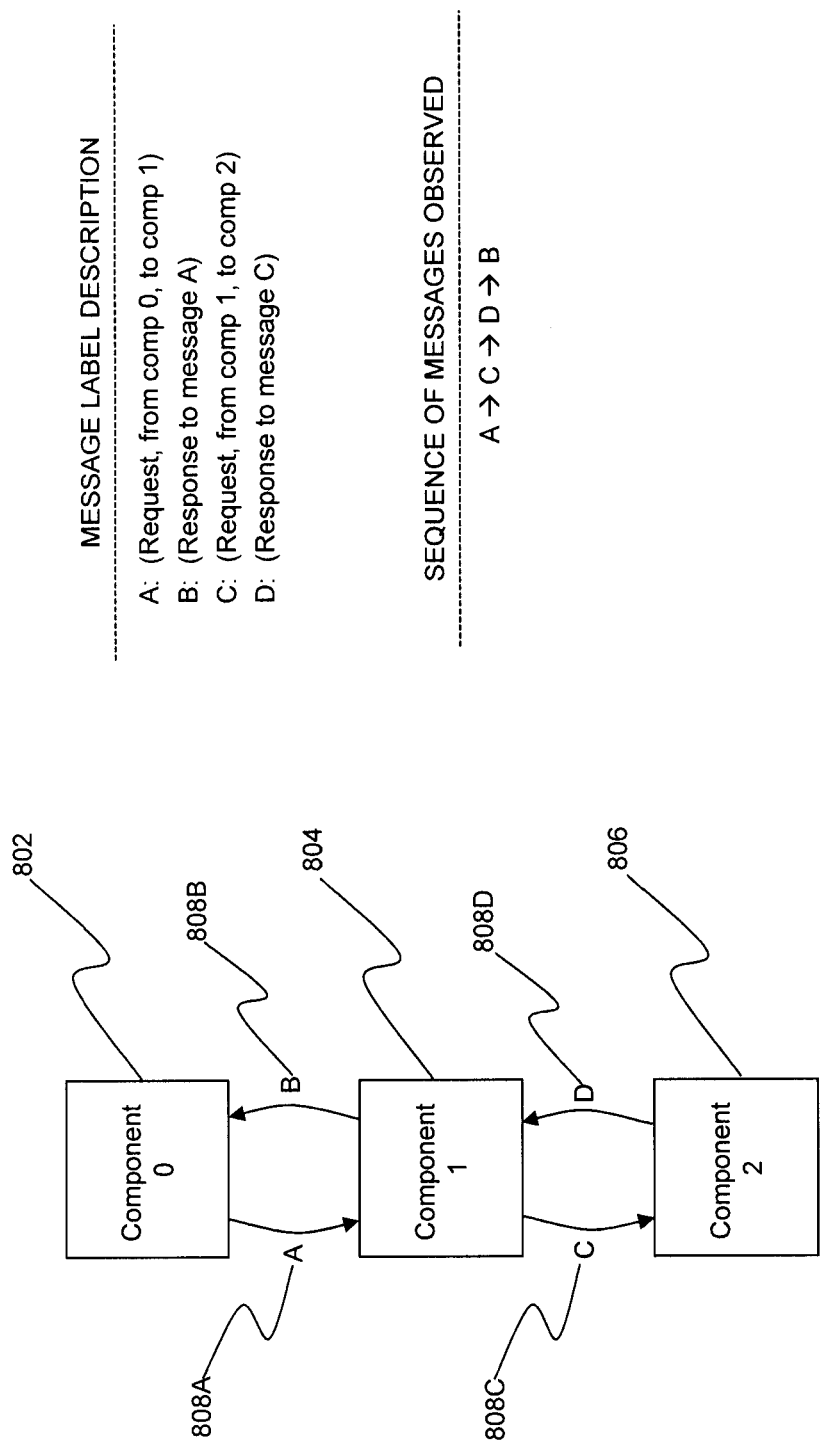
FIG. 8 illustrates an exemplary scenario for call flows relative to logical processing units.

FIG. 8 is an exemplary scenario wherein components 802-806 may each represent logical unit of processing, which may communicate with one another via messages 808A-808D in processing a request made to a distributed application. In one example, such logical units of processing may be API server 510, compute controller 520, authorization manager 530, compute manager 570, object store 540, or compute worker 576 of the example distributed application in FIG. 5. Other component granularities are also contemplated by various embodiments of the disclosure. For example, a component may represent a process, a virtual machine, a physical machine, a cluster of machines, or other software/hardware unit.

Messages 808A-808D may be any type or format of messages utilized for communication between components of a distributed application (e.g., cloud service application 110). In one example, messages 808A-808D may be routed through a message queuing service such as AMQP, ZeroMQ, STOMP, or XMPP. In another example, messages 808A-808D may be transported over HTTP. Messages 808A-808D may include a payload encoded in appropriate serialization formats such as XML or JSON, regardless of the transport mechanism. In yet another example, messages 808A-808D may represent remote SQL requests and responses.

In the example scenario of FIG. 8, message 808A, message 808B, message 808C, and message 808D may be observed in the order indicated, for example, by using message snooping, instrumentation, or other observation techniques further disclosed herein. As also indicated in FIG. 8, it may be observed that message 808A and message 808C are request messages to component 804 and component 806 respectively, whereas message 808B and message 808D are response message to message 808C and message 808A respectively. Based on such observation, a call flow graph may be constructed, encoding the causal relationship in which Component 702 "calls" component 804, which in turn "calls" component 806. More specifically, by observing that the request/response message pair of message 808C and message 808D is nested inside (e.g., appears in between) the request/response message pair of message 808A and message 808B, it may be inferred that the two request/response message pairs belong to one call flow initiated by and returning to component 802.

Figure 9:
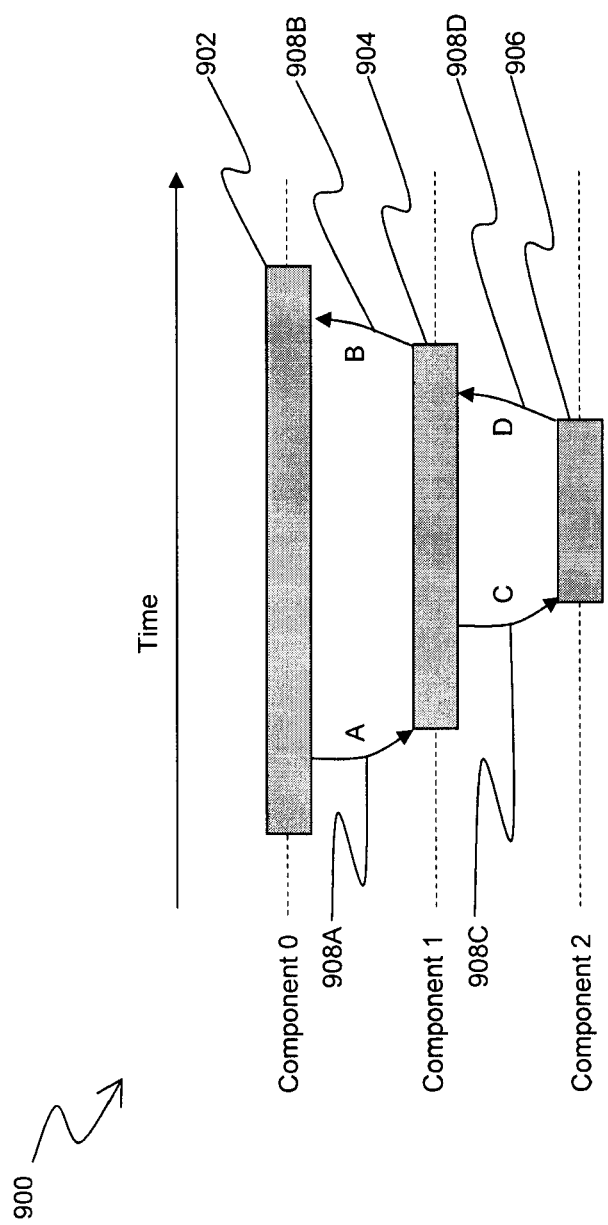
FIG. 9 is a view of a call flow graph corresponding to the example scenario of FIG. 8.

FIG. 9 is a view of a call flow graph corresponding to the example scenario of FIG. 8, illustrated as a sequence diagram 900 of processing and communication activities rather than as a directed graph. In this example sequence diagram illustration, processing activities at components may be represented by blocks 902, 904 and 906 on parallel timelines, with requests and responses shown using directed arcs 908A-908D to and from the blocks 902, 904, and 906. As may be understood from the sequence diagram of FIG. 9, temporal relationships (e.g., the relative timing), as well as causal relationships, between components may be discovered by observing messages sent to and from components. It should be noted, however, that the graphs, diagrams, illustrations, or presentations of communicating components and corresponding call flow graphs given in FIGS. 8-9 are provided for purposes of exposition, and that the systems and methods of the disclosure may observe other communication scenarios or patterns to construct call flow graphs utilizing any other suitable form, data structure, or presentation.

In the example scenario above it is assumed that the request/response pairs and the order thereof may be deterministically identified to construct a representative call flow graph. However, in a distributed application, it may be often the case that request/response message pairs and the order thereof are not so definite, especially if the distributed application permits asynchronous communication between components. In fact, even for the simple example scenario of FIG. 8, it cannot be conclusively determined that message 808C is caused by message 808A, since message 808C may well have been triggered by another earlier asynchronous request to component 804.

In this regard, some embodiments of the disclosure may be adapted to provide a probabilistic picture of call flows originating from and returning to a particular component. That is, if necessary or desired, some embodiments of the disclosure may construct a plurality of probable call flow graphs with probabilistic values attached to them, instead of constructing one definite call flow graph.

Again, it should be appreciated that the graphs, diagrams, illustrations, or presentations of call flow graphs and distributed call stacks given above are provided for purposes of exposition, and that the systems and methods of the disclosure may utilizing any other suitable form, data structure, or presentation in constructing and/or presenting call flow graphs and distributed call stacks.

Figure 10:
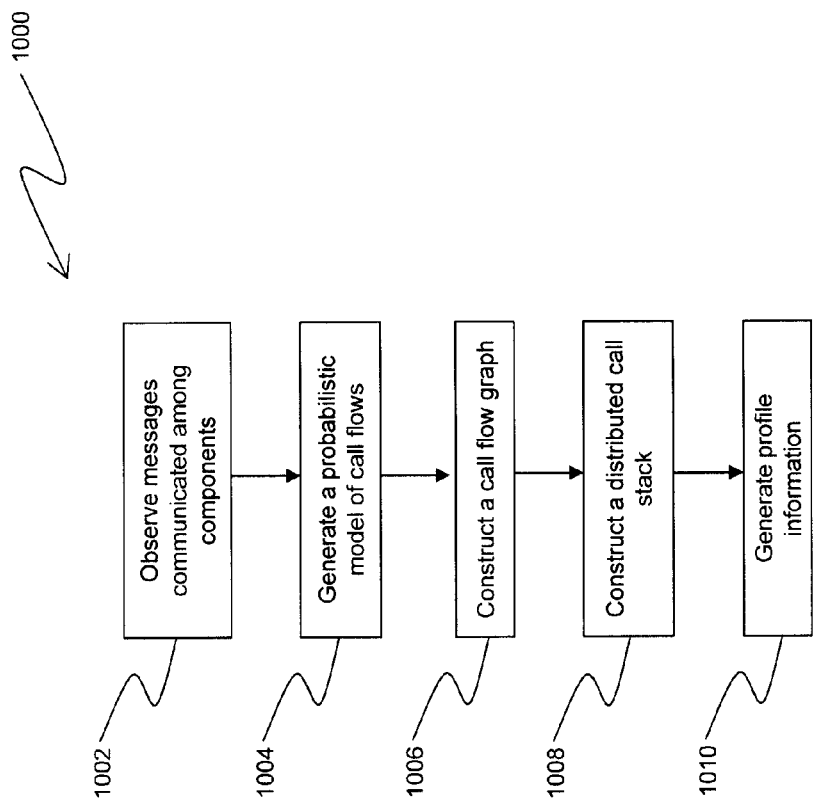
FIG. 10 is a flowchart of a tracing method in accordance with an embodiment of the disclosure.

Turning now to FIG. 10, a flowchart of a distributed tracing method 1000 is illustrated, in accordance with an embodiment of the disclosure. For example, all or part of distributed tracing method 1000 may be performed to construct a call flow graph or a distributed call stack described herein.

At block 1002, messages sent and received among various components of a distributed application may be snooped on, monitored, or otherwise observed. As would be understood by one skill in the art, a component is an encapsulation of a set of related functions and data. Components in a distributed application may communicate with each other via associated interfaces (e.g., APIs) over one or more defined communication mechanisms. Thus, messages exchanged among various components may be understood as being in any form of data unit or packet that carries requests and responses among components through any form of associated interfaces over any communication mechanism supported by a distributed application. Further, while the logical boundary of a component may typically be defined by the associated interface that is shared by functions or objects that make up the component, other component granularities may well be supported by embodiments of method 1000. For example, the messages being observed may be those that are exchanged among software processes, among virtual machines, among physical machines, among network nodes, or among other logical/physical units. In one embodiment, method 1000 may permit a user to define component boundaries or granularities.

For many distributed applications, infrastructure for asynchronous communication between various components may be provided by a message-oriented middleware (MOM), such as those based on AMQP, STOMP, ZeroMQ, or XMPP. MOMs typically support asynchronous communication through publish-subscribe messaging pattern and/or a message queuing service. Accordingly, in one embodiment, messages may be observed by subscribing to various message queues or mailboxes through which components communicate various requests and responses. A message queuing service may support passive listening on message queues, which may be utilized to implement the subscription-based observation technique. If a passive listening mode is not supported, the message queuing service may be modified to allow receiving of messages from queues without consuming them.

For some distributed applications, requests and responses between components may be managed through an object request broker (ORB), such as those provided in CORBA, DCOM, and (XPCOM) or other distributed object architecture. In some distributed applications, components may communicate through various other conventional inter-process or inter-component communication protocols and standards, such as HTTP requests/responses, remote SQL queries/responses, RPC, or remote method invocation (RMI). Yet in other distributed applications, components may communicate through any combination of the above communication mechanisms.

Accordingly, in some embodiments, messages between components may be observed by instrumenting (e.g., modifying to generate message traces) various libraries, runtimes, or other applicable system or middleware routines at appropriate tap points. For example, in one embodiment, an ORB runtime, or other similar runtime for marshalling messages in a distributed object broker architecture, may be instrumented to generate and transmit a message trace describing the object call or return message being marshaled or otherwise processed for transmission. In another embodiment, an RPC, RMI, or other IPC runtime may be instrumented to generate and transmit a message trace when a call or a return is being handled. Conventional RPC or RMI logging tools may be leveraged in this embodiment. In yet another embodiment, an HTTP gateway or a remote database server gateway may be instrumented to generate and transmit a message trace in response to receiving and sending of requests and responses.

Observing messages at lower layers of communication is also contemplated. For example, the tap point for observation may be at a transport/network layer, where TCP packets may be "sniffed" or otherwise monitored. Conventional tools such as tcpdump may be leveraged for such a purpose. In another example, the tap point may be at a data link layer, where network frames may be "sniffed" or otherwise monitored. This may be achieved by, for example, running a promiscuous mode on a network interface controller (NIC) and associated driver software that are capable of such a mode.

Packet sniffing, frame sniffing, or other lower-layer observation technique may permit leveraging of existing tools to support message observation across various platforms, regardless of the communication or messaging protocols being utilized in the distributed application. As such, a lower-layer observation technique may be utilized if instrumentation of messaging runtimes and/or frameworks is not desired or convenient. However, because request/response messages may be translated into multiple (e.g., fragmented), partial, or overlapping (e.g., pipelined) packets/frames at a lower layer, some processing may be required to reconstruct or group such packets/frames into a corresponding message. Further, if the communication pattern of a distributed application exhibits a high packet rate, the packet sniffer or the frame sniffer (e.g., a software and/or hardware module for passive observation of packets/frames) may become overloaded and drop some packets or frames. While such overloading may be mitigated if flow control is enabled, controlling the flow of packets may be too intrusive and/or adversely affect tracing performance.

In various embodiments, any one or any combination of the various tap points and the associated message observation techniques described above may be utilized as desired or necessary to observe request/response messages among a set of related components (e.g., components in one or more services) involved in processing a request made to a distributed system. For example, a lower-layer observation technique may or may not be utilized depending on the above-identified benefits and costs of such a technique under a given distributed application architecture. In another example, a message queue/mailbox subscription technique may be utilized to observe messages that are not traceable in lower layers, such as those messages that are exchanged among components or virtual machines residing in one physical machine and thus only pass through message queues/mailboxes within that same physical machine. In yet another example, a combination of two or more observation techniques may be desired to observe all messages being exchanged through more than one message exchange mechanisms being utilized by the distributed application to be traced.

In this regard, some embodiments of method 1300 may handle heterogeneity of request/response message formats, tap points, and transport mechanisms. In one aspect, management of such heterogeneity may involve merging of multiple streams of observed messages or message trace from different tap points and/or different machines into one stream of observed messages. To merge multiple streams in an order approximating the correct message ordering, some embodiments may timestamp observed messages or message traces. Timestamp synchronization may be performed using known techniques, such as the network time protocol (NTP). As known in the art, NTP may be able to synchronize clocks on the same local area network with a clock skew of less than 1 msec., and over the global Internet with a clock skew of less than 5 msec. under typical conditions. As such, NTP or other available techniques with similar guarantees may be sufficient for most communication patterns among components of distributed applications. Approximating a merged stream of observed messages without relying on timestamps and/or time synchronization is also contemplated.

Another aspect of handling such heterogeneity may involve capturing the observed messages in a uniform abstract representation. Although the observed messages may rely on different formats and communication mechanisms depending on the tap point for observation, some common information may be extracted for a uniform abstract representation. For example, a process identifier (ID), a node ID, or other information identifying a sender and/or a receiver of a message may be obtained, by inspecting the routing envelop of a message published to a messaging queue/mailbox or by inspecting appropriate data structures or protocol stacks associated with an ORB, an RPC mechanism, a TCP mechanism, or other communication mechanism. For some types of messages (e.g., a conventional RPC message, an RPC directed message over a message queuing service, or other messages supporting a matched request/response communication pattern), a call ID, a message ID, a socket descriptor, a socket address, or other information that permits matching of a request and response pair may be obtained. For some types of messages, it may be possible to obtain information as to whether a message is a request or a response.

Accordingly, in one embodiment, various types of messages observed at various tap points may be abstracted and uniformly represented as a tuple comprising a sender ID, a receiver ID, a request/response indicator, and/or a call ID. As may be appreciated, such a representation need not be complete, but instead capture only the information obtainable from a particular observed message. For example, a tuple representing an observed message may be missing a receiver ID or a call ID if not obtainable. In another embodiment, a tuple representing an observed message may further comprise a timestamp to be utilized in merging and ordering multiple message streams as discussed above. In another embodiment, a tuple representing an observed message may further comprise an information field regarding the form of the message (e.g., whether the message is a published message to a messaging queue/mailbox, an RPC call/return, an HTTP request/response, or other form of message that may be supported in a distributed application).

Using the information captured in the abstract representation of messages, a request message may be matched with a corresponding response message. In some embodiments, if a call ID, a message ID, or other information that uniquely identifies a request message is available, a later response message carrying the same ID may be matched with the request message as a request/response pair. In some embodiments, if a call ID, a message ID, or other information that uniquely identifies a request message is not available but sender ID and receiver ID are available, a probable request/response pair may be statistically identified by observing historical occurrences of a later message with sender and receivers inverted from those of an earlier message (e.g., a receiver of an earlier message sends back a later message to the sender of the earlier message).

In some embodiments, the abstract representation of messages may further include other information obtainable from messages. For example, various forms of request messages in a distributed application may comprise information regarding the name of a function (e.g., a method, a procedure) to be called along with any applicable function arguments. Such information may be embedded in a payload or message body for some forms of messages (e.g., a published message to a queue or an HTTP request), and may be embedded in a header or other data structure for other forms of messages (e.g., an RPC call). In one embodiment, such information may be obtained by, for example, parsing a serialization data format (e.g., JSON, SOAP, or other similar format) encapsulating a function name and arguments. In another example, response data (e.g., a function return value) may be extracted from the payload or message body to be included in the abstract representation of messages for some embodiments.

In some embodiments, the above-described representations of messages may be utilized in the message traces described above in connection with various instrumentation techniques. In other words, in some embodiments, what may be generated and transmitted through instrumentation is one of these abstract representations of an observed message.

By abstractly and uniformly representing the observed messages as described above, various embodiments of method 1300 may permit identification of similar messages transmitted among various components of a distributed system. For example, an earlier request message from component 0 to component 1 and a later request message again from component 0 to component 1 may be identified as similar request messages. Such identification may allow embodiments of method 1000 to observe historical patterns of communication behavior among components to build a probabilistic model of a call flow, further described below with respect to block 1004.

Various embodiments of method 1000 may permit identification of similar messages at various levels of differentiation. That is, by adjusting how tight or loose the match between messages is made, the messages may be treated as dissimilar or similar. For example, suppose that two request messages share the same sender, the same receiver, and the same function name to be called, but differ with respect to function arguments. The two messages may be classified as dissimilar messages if function arguments are also considered. Otherwise, the two messages may be identified as similar.

In another example, suppose that similar request messages from a sender may be received and responded to by any one of multiple receivers capable of performing similar tasks (e.g., multiple workers with similar personality and subscribing to a same topic queue). Such a situation may be encountered when requests are broadcast and/or when requests are routed for load balancing. Response message to the sender from the various receivers may be treated as similar or different depending on the extent of differentiation desired. Other examples include, but are not limited to, differentiating based on machines (including virtual and physical machines) that sender or receiver may be running on, based on IP address domains, or based on message communication mechanisms (e.g., through a message queuing service, over an HTTP request/response, an RPC call/return, or other forms).

The extent of message differentiation may affect how a call flow among components may be presented. That is, a more aggregate view of a call flow may be presented (e.g., as a call flow graph described further herein) if messages are less differentiated, whereas a more differentiated view of a call flow may be presented if messages are further differentiated. A more aggregate view may permit a distributed application developer or other relevant user to efficiently and quickly understand the overall call flow, whereas a more differentiated view may allow tracking and pinpointing of a particular behavior specific to a particular situation.

For example, in the multiple workers situation in the preceding paragraph, an aggregate view may present the different calls received at different workers as a single call, whereas a differentiated view may present the different calls to different workers as separate calls. The differentiated view may be beneficial, for example, in case an abnormal behavior afflicts a specific worker at a specific node rather than a specific tasks that all workers are configured to perform. Thus, by permitting various levels of differentiation or aggregation of like messages, various embodiments may beneficially aid distributed application developers or other relevant users through alternate views of call flows corresponding to different levels of aggregation. A front-end user interface, or other front-end tool for method 1300, may be configured, for example, to allow users to choose a criterion for differentiation and to aggregate or expand view of a call flow as desired.

In some distributed applications, components may be grouped into one or more sets of related components that together provide a well-defined set of related functionalities. Such a set of components may be referred to as a service. Some distributed applications, such as a cloud service system, may comprise one or more independent, interoperable services to process external client requests. The cloud computing system 130 of FIG. 1b for example, may be a distributed application with distributed components.

While in some cases services may be purely logical groupings of components, in more typical cases services may be structurally or architecturally distinguishable as well. That is, services are typically independent and loosely coupled through external endpoints (e.g., API server 410), whereas within services components are typically limited to communicating with components within the same service through internal communication points (e.g., internal API 420).

As such, some embodiments of method 1300 may distinguish between inter-service messages and intra-service messages. For example, in embodiments where message observation may be through subscription to message queues or mailboxes provided in a MOM, messages may be distinguished by whether they are from message queues utilized by a particular service or by a group services for inter-service communication. In such embodiments, message queues associated with each service, as well as message queues for inter-service communication, may be subscribed to for message observation, thus permitting distinguishing of messages associated with a particular service, a group of services, or inter-service communication as desired.

In embodiments utilizing other observation techniques, such as the instrumentation-based observation techniques, appropriate tap points within each service (e.g., RPC runtimes utilized by components within one service), as well as appropriate tap points for inter-service communication (e.g., HTTP gateway or external API endpoint associated with a service), may be instrumented to observe and/or distinguish all intra-service and inter-service messages of interest for purposes of distributed tracing and/or debugging of a distributed application.

More generally, messages may be referred herein as being associated with a "message domain." In the description above, each service may comprise a distinct message domain. As such, intra-service messages and inter-service message may well be referred to as intra-domain messages and inter-domain messages, respectively, in the description above. However, it is also contemplated that more than one service may belong to a same message domain as desired for an application of method 1000.

Thus, in various embodiments, method 1000 may advantageously permit presentation of a view of call flows (e.g., as call flow graphs constructed as further described below) that may be limited to a particular service/domain, to a particular set of services/domains, or to only calls among services/domains as desired for a tracing and/or debugging activity of a distributed application. As such, various embodiments of method 1000 may beneficially aid a distributed application developer or other relevant user in efficiently and effectively tracking down a cause of an abnormal behavior or analyzing performance profiles.

Turning now to block 1004, a probabilistic model of call flows may be generated using the observed messages (e.g., a sequence of merged message traces). In one embodiment, a Markov chain may be modified and utilized as the probabilistic model. As may be appreciated, a Markov chain may be efficiently constructed by observing a sequence of historical patterns, and may provide probabilistic prediction of future states (e.g., patterns) based on a current state. Accordingly, in one embodiment, a Markov chain may be generated from the sequence of observed messages obtained at block 1002. The generated Markov chain may provide probabilities of a particular message (or sequence of messages) being communicated following an occurrence of a given message in a distributed system.

At block 1006, a call flow graph may be constructed based on the generated probabilistic model. The call flow graph may comprise one or more candidate call flow graphs with associated probabilities of occurrence. In various embodiments, one or more probabilities associated with corresponding one or more sequences of messages may be calculated from the probabilistic model. If desired, the one or more sequences of messages may be required to have the same start message and the same end message. For example, the start message may be the first message in a call flow to be traced, such as a request message sent from an external API of a service into a component of the service that may in turn trigger a sequence of messages between components of the service. For example, the end message may be a response message sent back to the external API of the service.

The process of calculating of a probability associated with a sequence of message may vary depending on the underlying probabilistic model. For example, in embodiments where the underlying probabilistic model may be adapted to produce a state transition diagram (including state transition matrix, probabilistic state machine, or other similar representation), the probability of a given sequence of messages occurring is a product of transition probabilities corresponding to the given sequence.

The various operations of blocks 1004-1006 may be omitted, for example, if a probabilistic picture of call flows is not necessary or desired. That is, for example, if call flows are deterministic (e.g., all call/return pairs are synchronous and all calls are to pure functions without side effects) or pseudo-deterministic (e.g., having a very low probability of non-deterministic behavior), a call flow graph may be constructed without a need for the probabilistic modeling described above. In such a case, the observed sequence of messages (e.g., a repeating chunk of messages in the observed sequence) may be constructed directly into a call flow graph.

At block 1008, a distributed call stack may be constructed. A distributed call stack may describe a more comprehensive execution flow through and across processes of components in a distributed application. In various embodiments, descriptions of one or more call stacks (e.g., execution stacks, runtime stacks) associated with corresponding one or more processes of components in the call flow (e.g., as identified in the constructed call flow graphs), may be received from, for example, per-process tracers. The received descriptions of per-process call stacks may then be combined with the call flow graph to construct a distributed call stack.

In one embodiment, a description of a call stack associated with a process of a component may be transmitted when a message to another component is transmitted. For example, the description may be transmitted when the message is published to a messaging queue (e.g., when a publisher object is instantiated to push the message to the queue), an RPC call routine is invoked, or a send call to a network socket is invoked. Further, when a message from another component is received, a description of a call stack associated with a process of a receiving component may be transmitted, with an updated description being transmitted when the call stack grows or otherwise changes. By transmitting updated descriptions, a more comprehensive view may be provided of the execution flow within the process once the message is received from another component. For example, a per-process tracer may be configured transmit initial and updated call stacks once the message is fetched from a messaging queue (e.g., when a consumer object is instantiated to dispatch the message to an appropriate process), an RPC routine dispatches an RPC call to an appropriate process, or an operating system trap indicating a receipt of packet is signaled.

In other embodiments, the description may be transmitted based on other schedules. In one example, the description of per-process call stacks may be transmitted on demand when requested by, for example, a distributed tracing service configured to perform various operations of method 1000. In another example, the description may be transmitted periodically by processes associated with components in the call flow. In yet another example, the description may be transmitted at user-defined breakpoints.

The description of per-process call stacks may comprise, in one embodiment, the name (if available from a symbol table or other debugging information) or other identifiers of the functions/methods in the call stack. In other embodiments, the description may comprise other information, such as the function arguments, return values, and/or local variables.

In one embodiment, the received descriptions of per-process call stacks may be recorded and matched with corresponding observed messages. The appropriate ones of the recorded descriptions may then be selected and combined with the constructed call flow graphs to construct a distributed call stack. For example, the appropriate ones of the recorded descriptions may be selected by locating from the sequence of observed messages one or more subsequences that match the constructed call graph, where the per-recorded descriptions associated with the messages in the subsequences may be selected as the appropriate ones of the recorded descriptions. Multiple per-process call stacks may be provided as alternates in case there are more than one per-process call stacks that may be associated with a process of a component in the call flow. In another embodiment, the descriptions of per-process call stacks may be received, matched, and combined with the call flow graph on the fly, for example, when the call flow graph is replayed and/or stepped through.

At block 1010, profile information (e.g., performance profile, service profile, or execution profile) associated with the constructed call flow graph may be generated. In various embodiments, the profile information may include one or more metrics such as the number of times a component is called, the average response time of a component, or other execution-related metrics. In one embodiment, the number of calls to a component may be obtained by counting the number of request messages sent to the component in the observed messages. In one embodiment, the timestamps differences between request messages to and corresponding response messages from a component may be statistically compiled to provide an approximation of execution time spent in the component. In one embodiment, per-process performance profile information (e.g., execution time of and/or frequency of calls to each function in a process) may be received and combined with the component-level profile information to provide more detailed and/or accurate profile information for the distributed call stack. The profile information may beneficially aid distributed application developers in identifying critical paths or hot spots in a distributed execution, and/or otherwise understanding execution behavior of a distributed application.

Therefore, a system and methods are provided for a cross-process, cross-platform and cross-machine tracing of a distributed application. Tracing as described herein provides superior visibility into performance of a distributed application and causes for error in order to increase the reliability of applications and provide higher service. In addition, call flow graphs enable tracing down into a process, output the process, and across the process, machine, service and network boundaries to show an entire call stack from entry of a call to the API to where work is performed and back.

Figure 11:
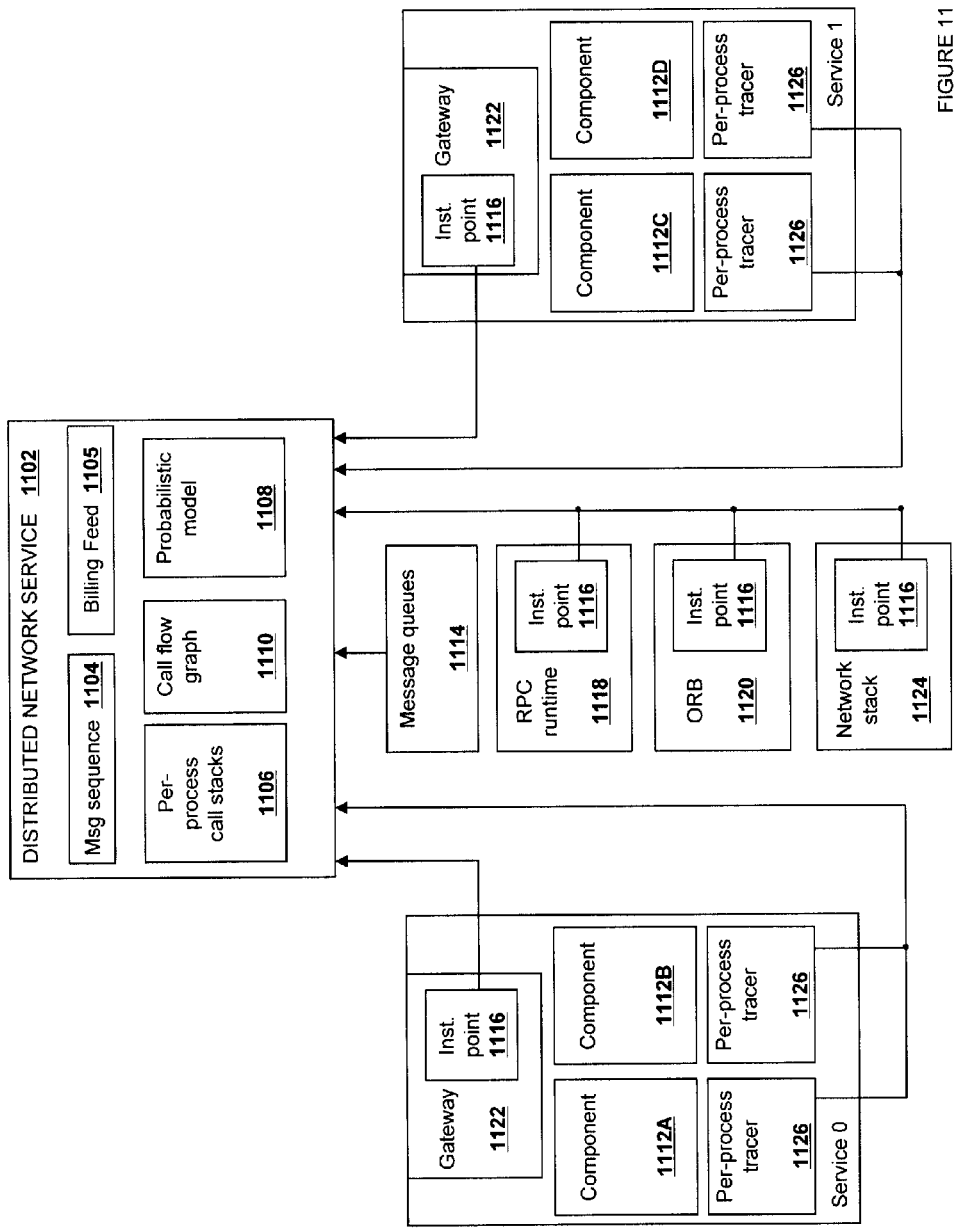
FIG. 11 is a block diagram of a tracing system in accordance with an embodiment of the disclosure.

Referring now to FIG. 11, a block diagram is illustrated of a distributed network system 1100, in accordance with an embodiment of the disclosure. For example, distributed network system 1100 may be configured to perform all or part of method 700 of FIG. 7 and/or method 1000 of FIG. 10 to construct a call flow graph, a call stack or billing feed. Distributed network system 1100 may comprise, in one embodiment, a distributed tracing service 1102, one or more instrumentation points 1104, billing feed module 1105 and one or more per-process tracers 1106. In one embodiment, distributed network system 1100 may be implemented on top of or as part of, for example, distributed application 110 of FIG. 1. It will be appreciated that distributed network system 1100 in no way is limited to or requires distributed application 110, and that distributed network system 1100 may be implemented on top of or as part of any other suitable distributed application, middleware, or computing system to beneficially provide thereto distributed tracing and/or debugging capabilities described herein.

Billing feed module 1105 may be configured to output one or more billable elements to a reselling system based on one or more traced messages. In one embodiment, distributed tracing service 1102 may be configured to subscribe or otherwise attach to one or more message queues 1114 to observe messages communicated among components 1112A-1112D through message queues 1114. For example, distributed tracing service 1102 may be configured to observe messages by performing the subscription-based observation techniques and operations described above in connection with block 1002 of FIG. 10.

In one embodiment, distributed tracing service 1102 may be configured to receive, from instrumentation points, message traces describing messages being communicated among components 1112A-1112D. In this regard, distributed tracing service 1112 may be configured to merge message traces from different instrumentation points 1116. Further in this regard, distributed tracing service 1112 may be configured to merge message traces received from instrumentation points 1116 with message traces obtained by observing message queues 1114. For example, distributed tracing service 1102 may be configured to implement the merging and message representation techniques and operations described in connection with block 1002 of FIG. 10.

In one embodiment, instrumentation points 1116 may be located at various tap points described above with respect to block 1002 of FIG. 10, including an RPC runtime 1118, an ORB 1120, a HTTP or remote database gateway 1122, and a network protocol stack 1124. In one embodiment, instrumentation points 1116 may be configured to generate and transmit to distributed tracing service 1102 message traces describing request/response messages that pass through the corresponding tap points as described above with respect to block 1002 of FIG. 10.

Per-process tracer 1126 may be configured to trace a call stack (e.g., an execution stack, a runtime stack) of a process of component 1112A-1112D by running the process under its environment, in a manner similar to call stack tracing in conventional single process tracers or debuggers. In one embodiment, per-process tracer 1126 may be further configured to transmit a description of the traced call stack to distributed tracing service in a manner described with respect to the distributed call stack generation at block 1008 of FIG. 10. In one embodiment, distributed network system 1100 may comprise as many per-process tracers 1126 as the number of processes that may run in the underlying distributed application. In other embodiments, there may be per-process tracers for some but not all of the processes that may run in the underlying distributed application.

In one embodiment, distributed tracing service 1102 may comprise appropriate data structures and related functions for encoding, constructing, and/or storing an observed sequence of messages 1104, per-process call stacks 1106, probabilistic models 1108, and call flow graphs 1110. Such data structures and related functions may be implemented, for example, as provided in the corresponding descriptions of method 1000 of FIG. 10. Thus, distributed tracing service 1100 may be configured to observe and store messages sent and received among components 1112A-1112D, generate a probabilistic model of a call flow, construct a call flow graph based on the probabilistic model, and receive and combine the descriptions of the per-process call stacks to generate a distributed call stack, in a manner consistent with the various techniques and operations described for method 1000 of FIG. 10.

In one embodiment, distributed tracing is implemented as an electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor, running as a discrete operating environment, as a process in an active operating environment, or can be run from a low-power embedded processor. In a second embodiment, the instruction processor takes the form of a series of interoperating but discrete components, some or all of which may be implemented as software programs. In another embodiment, the instruction processor is a discrete component, using a small amount of flash and a low power processor, such as a low-power ARM processor. In a further embodiment, the instruction processor includes a rule engine as a submodule as described herein.

In though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of generating a billing feed for a distributed network system providing cloud services, the method comprising: observing, by a tracing, service implemented on one or more processors, a plurality of messages sent and received among one or more service components of the distributed network system providing cloud services, wherein the observing includes receiving one or more sequences of message traces transmitted by the one or more service components, the one or more service components modified to transmit message traces in response to sending or receiving of messages; generating, by the tracing service, a call flow graph encoding of causal relationships between processing activities of the one or more service components of the distributed network system, the generating being based on the plurality of messages of the distributed network system; and outputting, by the tracing service, a billing feed for the distributed network based on the call flow graph encoding, to provide a billing feed including one or more billable events.

2. The method of claim 1, wherein the observing includes subscribing to one or more message queues of a messaging service associated with the distributed network system.

3. The method of claim 1, wherein the observing includes a separate tracing service within each service component of the distributed network system, the separate tracing service with a separate message domain.

4. The method of claim 1, wherein messages in the distributed network system are sent based on the routing envelope and observed by characterizing responses and requests.

5. The method of claim 1, wherein the call flow graph provides a representation of observed calls in the distributed network system as a call stack.

6. The method of claim 1, wherein the billable events are based on one or more of received requests, underlying resource usage, time of usage, scope of usage.

7. The method of claim 1, wherein the billable feed includes billable events based on requests to the reseller and reseller billing.

8. A distributed network system comprising:
one or more non-transitory computer readable media;
one or more processors configured to execute service components stored on the one or more non-transitory computer readable media:
wherein the one or more non-transitory computer readable media comprise:
a plurality of service components; a message service component to provide communication between the service components; and, a tracing service component configured to observe a plurality of messages sent and received among service components of the distributed network system, wherein the observing includes receiving one or more sequences of message traces transmitted by the one or more service components, the one or more service components modified to transmit message traces in response to sending or receiving of messages; generate a call flow graph encoding, the tracing service component being configured to generate based on the plurality of messages of the distributed network system, the call flow graph representing causal relationships between processing activities of the one or more service components of the distributed network system; and output a billing feed for the distributed network based on the call flow graph encoding, to provide a billing feed including one or more billable events.

9. The system of claim 8, wherein the observing includes subscribing to one or more message queues of a messaging service associated with the distributed network system.

10. The system of claim 8, wherein the observing includes a separate tracing service within each service component of the distributed network system, the separate tracing service with a separate message domain.

11. The system of claim 8, wherein messages in the distributed network system are sent based on the routing envelope and observed by characterizing responses and requests.

12. The system of claim 8, wherein the call flow graph provides a representation of observed calls in the distributed network system as a call stack.

13. The system of claim 8, wherein the billable events are based on one or more of received requests, underlying resource usage, time of usage, scope of usage.

14. The system of claim 8, wherein the billable feed includes billable events based on requests to the reseller and reseller billing.

15. A non-transitory computer-accessible storage medium storing program instructions that when executed by a computer cause the computer to implement a distributed tracing service in a distributed application to: observe a plurality of messages sent and received among service components of the distributed application, wherein the observing includes receiving one or more sequences of message traces transmitted by the one or more service components, the one or more service components modified to transmit message traces in response to sending or receiving of messages; generate a probabilistic model of a call flow from observed messages of the distributed system; and construct a call flow graph encoding, of causal relationships between processing activities of the one or more service components of the distributed network system, the constructing being based on the probabilistic: model for the distributed application.

16. A system for reselling resources of a distributed network, comprising
a reseller system configured to generate requests for cloud services; and
a distributed network system comprising:
one or more non-transitory computer readable media;
one or more processors configured to execute service components stored on the one or more non-transitory computer readable media;
wherein the one or more non-transitory computer readable media comprise:
a plurality of service components,
a message service component to provide communication between the service components, and,
a tracing service component configured to:
observe a plurality of messages sent and received among service components of the distributed network system, including receiving one or more sequences of message traces transmitted by the one or more service components, the one or more service components modified to transmit message traces in response to sending or receiving of messages;
generate a call flow graph encoding of causal relationships between processing activities of the one or more service components of the distributed network system, the generating being based on the plurality of messages of the distributed network system; and
output a billing feed for the distributed network based on the call flow graph encoding, to provide a billing feed including one or more billable events.

17. The system of claim 16, wherein the observing includes subscribing to one or more message queues of a messaging service associated with the distributed network system.

18. The system of claim 16, wherein the observing includes a separate tracing service within each service of the distributed network system, the separate tracing service with a separate message domain.

19. The system of claim 16, wherein messages in the distributed network system are sent based on the routing envelope and observed by characterizing responses and requests.

20. The system of claim 16, wherein the call flow graph provides a representation of observed calls in the distributed network system as a call stack.

21. The system of claim 16, wherein the billable events are based on one or more of received requests, underlying resource usage, time of usage, scope of usage.

22. The system of claim 16, wherein the billable feed includes billable events based on requests to the reseller and reseller billing.

* * * * *